United States Patent
Jendrisak et al.

[15] 3,673,900
[45] July 4, 1972

[54] GLASS CUTTING APPARATUS

[72] Inventors: Joseph E. Jendrisak, Northville, Mich. 48126; Harold E. McKelvey, Plymouth, Mich. 48170

[73] Assignee: Shatterproof Glass Corporation, Detroit, Mich.

[22] Filed: Aug. 10, 1970

[21] Appl. No.: 62,596

Related U.S. Application Data

[63] Continuation-in-part of Ser. No. 740,202, June 26, 1968, abandoned.

[52] U.S. Cl. ..................................83/11, 33/27 K, 83/12
[51] Int. Cl. ..................................................B26d 3/08
[58] Field of Search ..................83/11, 12, 8, 6; 33/27 K; 225/96.5

[56] References Cited

UNITED STATES PATENTS

| | | | |
|---|---|---|---|
| 2,045,586 | 6/1936 | Crowley | 33/27 |
| 2,375,378 | 5/1945 | Morris | 33/27 |
| 2,608,800 | 9/1952 | Ritter | 33/27 X |
| 2,746,153 | 5/1956 | Kuntz | 33/27 |
| 3,026,617 | 3/1962 | Jendrisak | 33/27 |

*Primary Examiner*—James M. Meister
*Attorney*—McCoy, Greene & Howell

[57] ABSTRACT

An automatic glass cutting apparatus having a table, a template ring supported above the table and having two peripheral cam tracks with curved shapes corresponding to that of windshield panes, motor means for feeding glass sheets to a position below the template ring, a cutter unit mounted to move on the template ring, and having one or more drive rollers engaging said ring, an air motor for driving said rollers to move the cutter rapidly around the ring, a cutting tool for engaging a glass sheet below the template, and a cam follower alternately engageable with one or the other of said cam tracks to locate the cutting tool as it travels around the template. The cutter unit has a unique construction and includes means for alternately switching the cam follower from one cam track to the other to determine the size of the pane being cut. Means are provided to slow down or deenergize the cutter motor when the cutters approach a sharp turn or approach the stop position.

35 Claims, 22 Drawing Figures

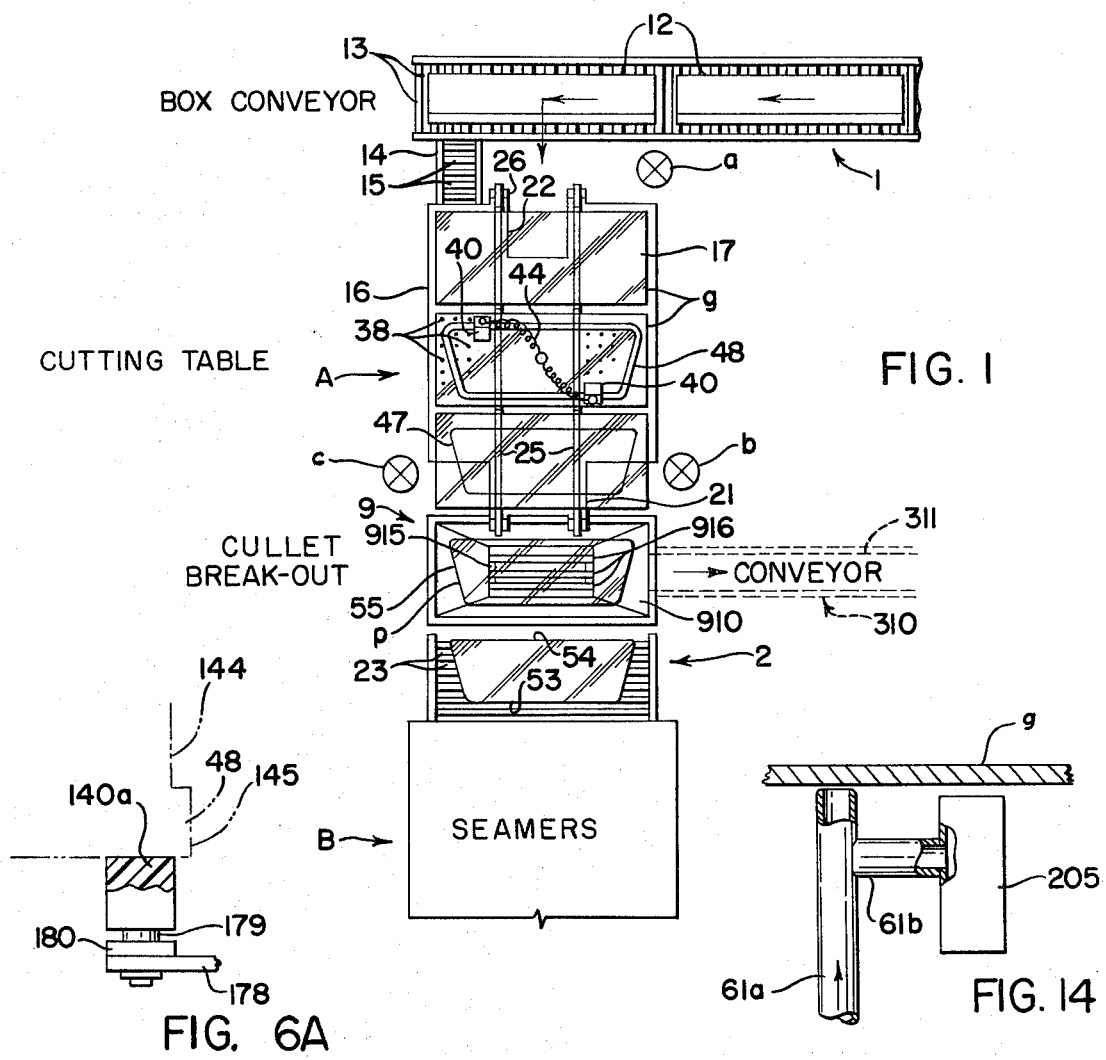

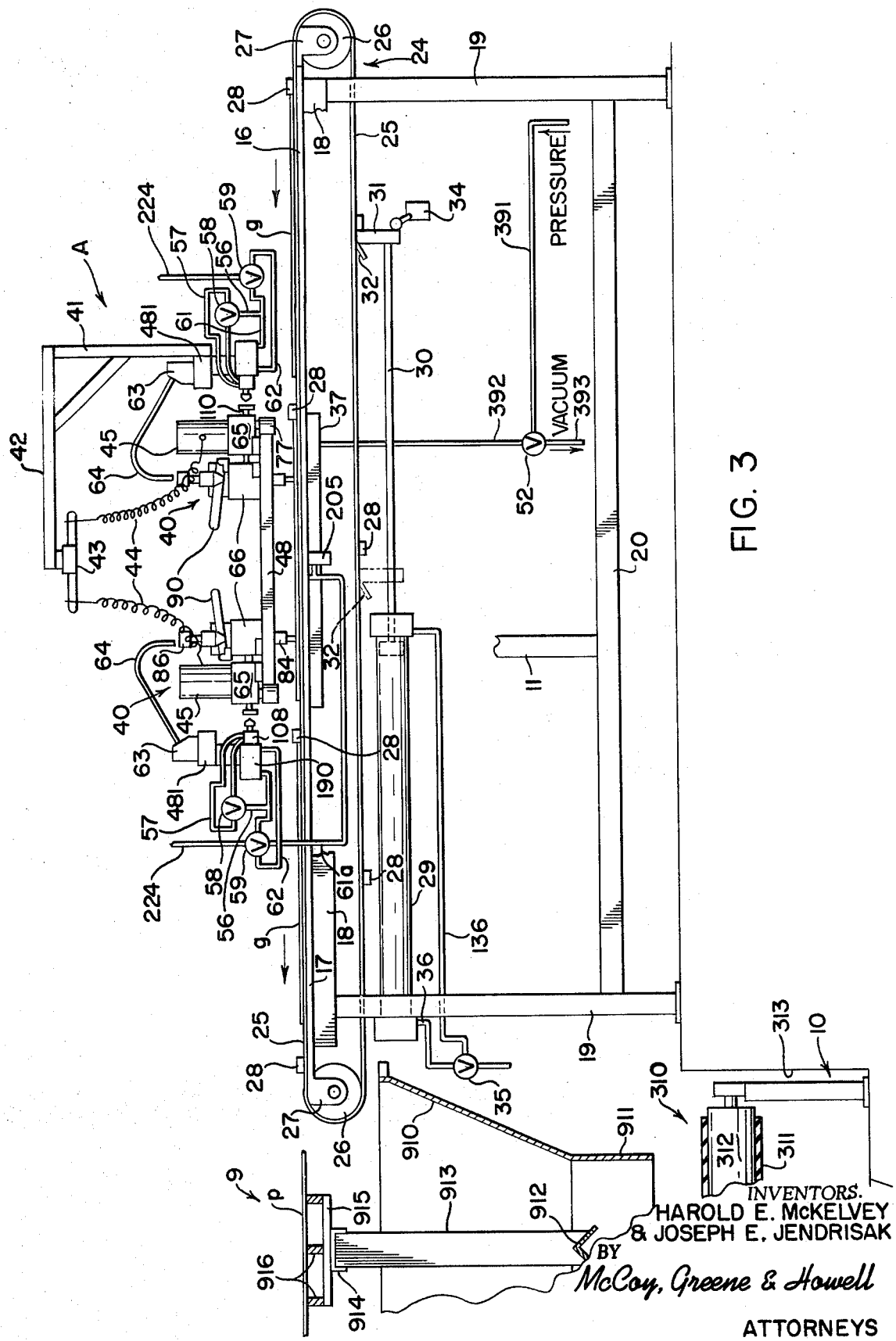

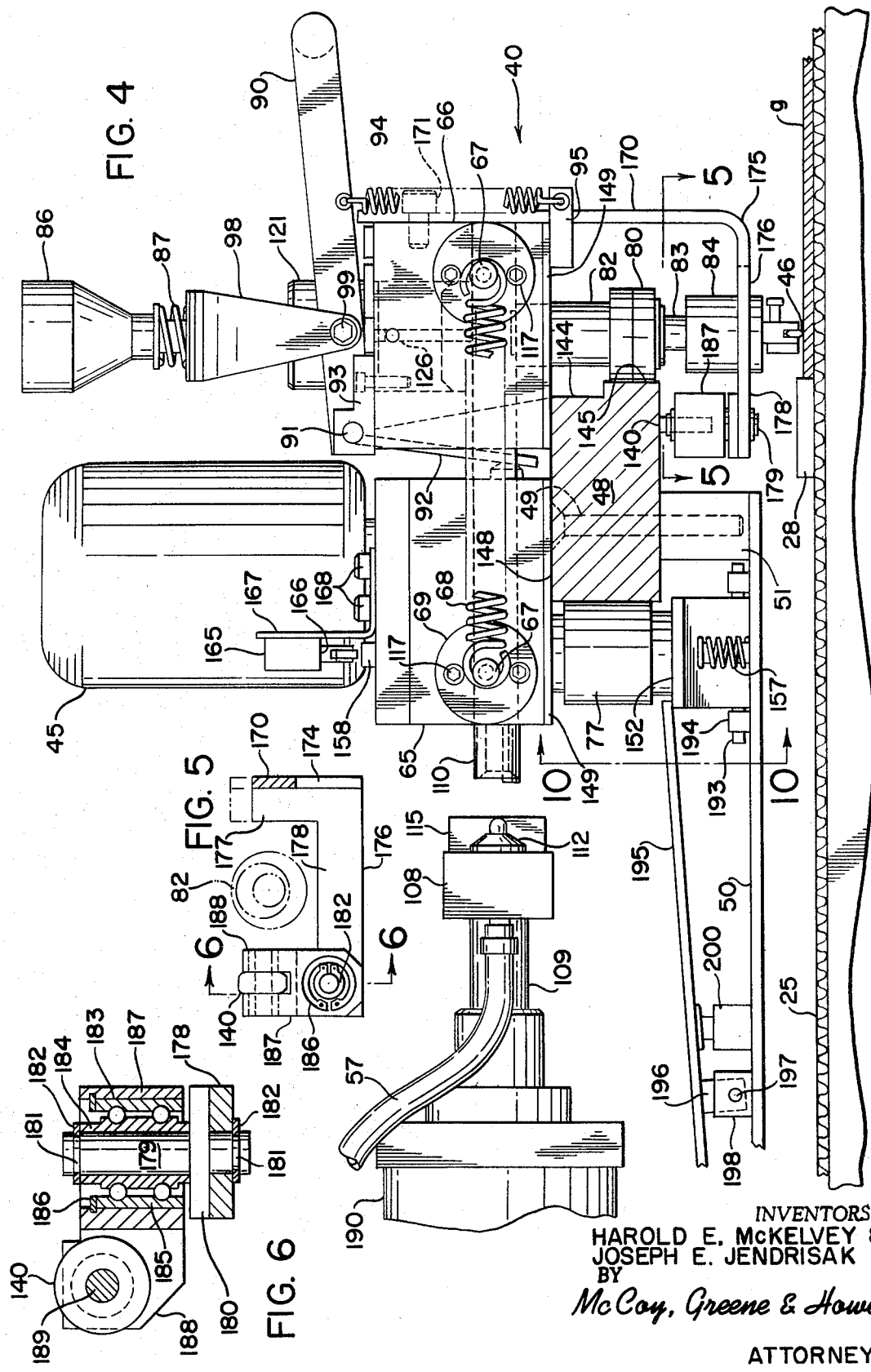

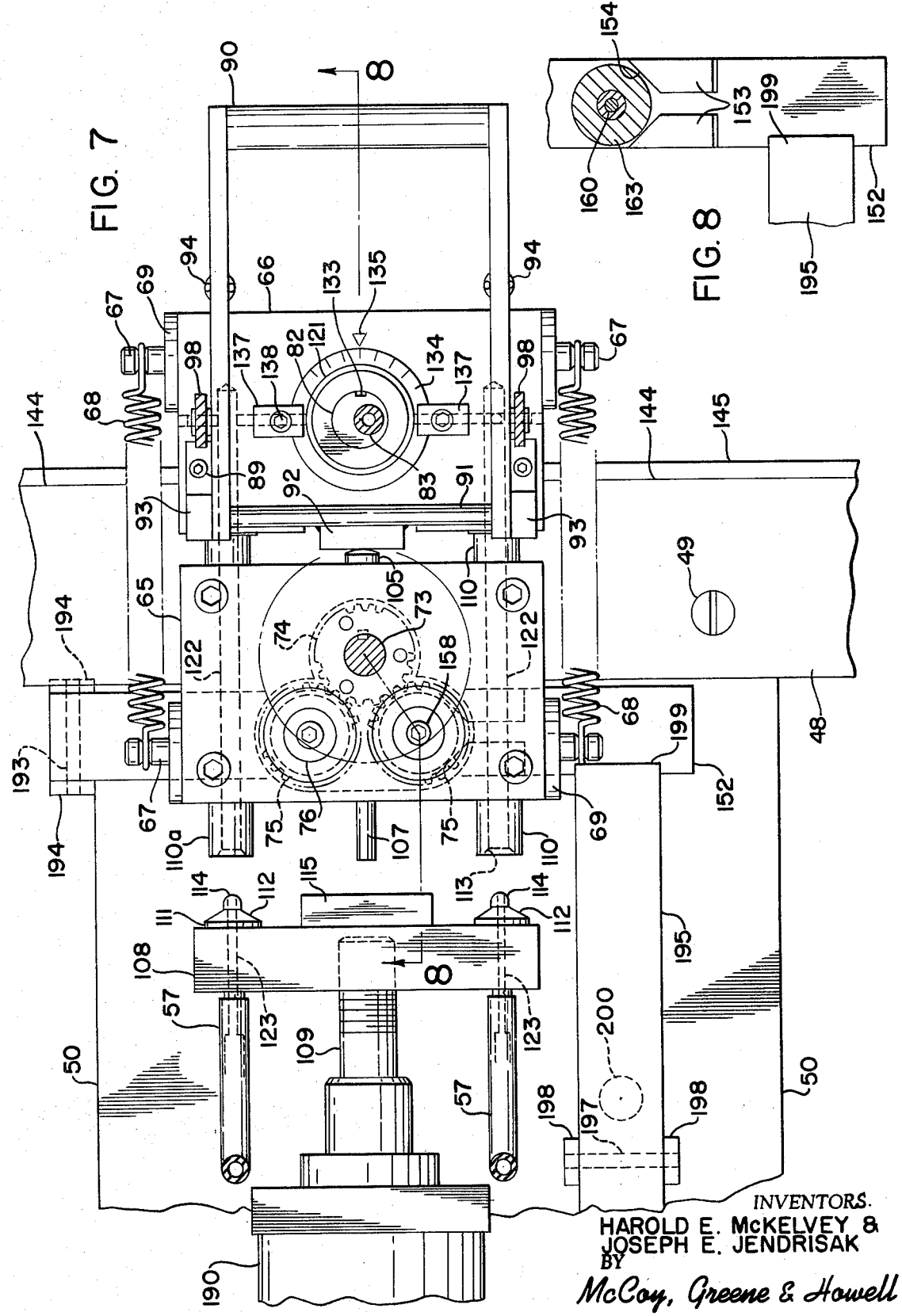

INVENTORS.
HAROLD E. McKELVEY &
JOSEPH E. JENDRISAK
BY
McCoy, Greene & Howell
ATTORNEYS

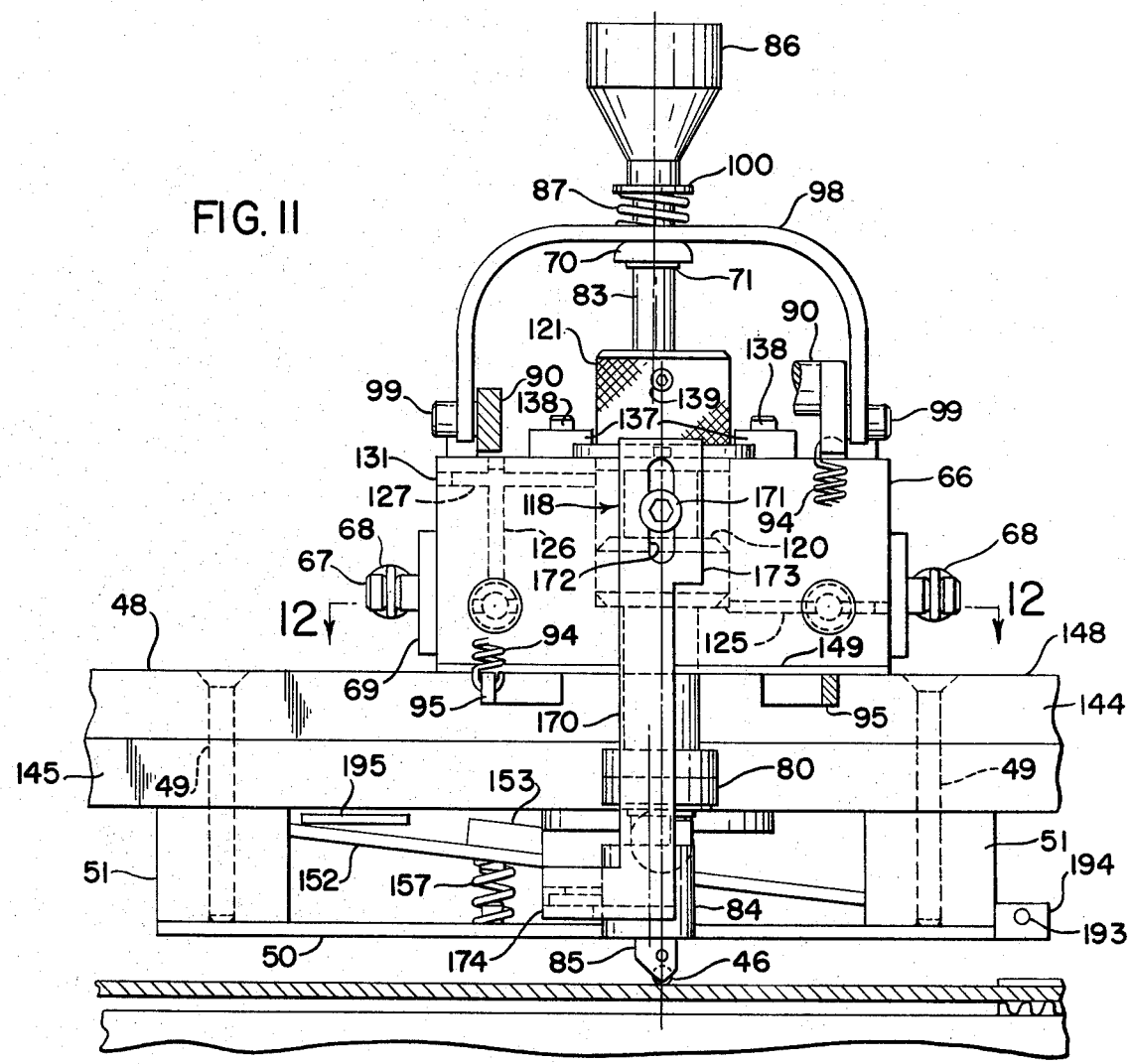

INVENTORS.
HAROLD E. McKELVEY &
JOSEPH E. JENDRISAK
BY
McCoy, Greene & Howell
ATTORNEYS

GLASS CUTTING APPARATUS

This application is a continuation-in-part of our copending application, Ser. No. 740,202, filed June 26, 1968 now abandoned.

The present invention relates to an apparatus for mass production of cut glass panes for bent automobile windshields and more particularly to automatic cutting apparatus having one or more high-speed motor-driven cutters which alternately cut panes of different size and provide matched doublets to be conveyed through suitable seamers to a glass bending machine.

The curved windshields of modern automobiles comprise two curved glass sheets with a plastic interlayer therebetween. Such glass sheets are customarily prepared from flat glass panes or lites which are bent together as a doublet to provide a proper fit. Because the edges of the windshield glass should be in matching relationship after bending, it is necessary to use two glass lites of slightly different size, the outer lite being longer than the inner lite.

Prior to this invention, flat windshield glass panels have been cut by moving a cutter unit around a template ring, the cutter unit being held by a massive swinging arm as it moved around the track. Cutters of this general type are disclosed in the following U.S. Pat. Nos. 2,045,586; 2,230,651; 2,270,462; 2,375,378; 2,608,800; 2,746,153; and 3,026,617. When making bent windshields using only one cutting machine, it was customary to cut a large number of panels with the machine set up or adjusted to produce one length, thereafter to cut a larger number of panels with the machine set up to produce a different length, and then to place each short panel with a selected larger panel to produce the matched doublet needed at the glass bending mold. The rate of production by these methods was necessarily limited.

The present invention greatly speeds up the glass cutting operation so as to facilitate mass production while at the same time minimizing labor costs. The light-weight cutter unit is specially constructed for reliable but extremely fast operation with means to slow down or deenergize the unit at sharp corners and/or the stop position and with improved means to hold the cutter unit on the template ring during high speed travel.

The cutting machine of the present invention alternately cuts the outer lite and the shorter inner lite of a windshield by shifting automatically between larger and smaller cam tracks of a unique template ring. This avoids the necessity for later matching of inner and outer lites as described previously and thus makes possible an automated mass-production line in which the cut glass moves directly from the cutter to the seamers and then through washing, drying and dusting zones to the glass bending apparatus.

Suitable stop means may be employed to stop the cutter unit temporarily in a predetermined position at the end of each cycle so that air under pressure may be introduced into the unit to effect raising or lowering of the cam follower from one cam track to the other while force is simultaneously applied to the cutter unit to separate the main blocks thereof and thereby release the cam follower from the template.

The cutter unit of this invention also has a unique shaft arrangement for supporting the cutter wheel and facilitating size adjustment. An eccentric shaft and dial indicator permit trouble-free manual size adjustment from the top of the cutter in a matter of seconds. Also, the long cutter shaft or stem extending through said eccentric shaft provides improved support with greater accuracy and reduced wear which permits accurately controlled oiling of the cutting wheel from the top of the machine, as by an automatic oiler. This arrangement also permits use of a continuous or steady drip oiling system. The prior art cutting machines had the cutter stems supported underneath the main body of the cutting unit in a fashion which limited their length, required a cumbersome and indirect oiling system, and resulted in wear, binding and inadequate lubrication.

When practicing the present invention, best results are obtained by using a rotary air motor to drive the cutter unit. This permits reduction in the weight of the unit, lowering of the center of gravity, and operation at substantially higher speeds so that one cutter unit is sufficiently fast to handle a production line operating at a normal speed of around eight or nine lites per minute. The quick cushioned deceleration provided by the air motor also facilitates accurate positioning of the cutter unit at the end of each cycle and makes it unnecessary to provide a retractable stop ramp or the like at the stop position.

The cutter unit of this invention is maintained in a level position on the template ring by a novel anti-friction means which is maintained in engagement with the bottom surface of the ring and assists the drive roller or rollers in resisting tipping as the cutter unit moves around sharp corners of the template ring. This arrangement makes it possible to reduce the eight of the cutter unit to a fraction of the cutting pressure applied to the glass and to provide a substantially uniform cutting pressure throughout each cutting cycle. Such pressure may readily be adjusted in accordance with the thickness of the glass to be cut and may be several times the overall weight of the cutter unit. Such arrangement also permits use of a template ring which is not flat and the cutting of glass sheets which are not flat.

The apparatus of the present invention may also employ a control arm on the cutter unit with a cam follower extending forwardly a substantial distance and engaging the template ring to anticipate a sharp curve in the ring, whereby the cutter motor is slowed down before the cutter reaches such curve.

An object of the invention is to provide inexpensive mass production of glass lites for automobile windshields.

A further object of the invention is to provide accurate and reliable equipment for extremely fast cutting of windshield glass or glass panels of intricate shape.

A still further object of the invention is to provide automatic high-speed glass cutting apparatus which alternately cuts windshield glass panels of different length.

Another object of the invention is to provide a windshield cutting apparatus which can easily be adjusted in a few seconds without substantially interferring with production.

Another object of the invention is to provide more uniform cutting pressure when cutting glass sheets;

Another object of the invention is to provide a more efficient oiling system for a glass cutter;

A still further object of the invention is to provide a speed control for a glass cutter which permits extremely fast operation when using template rings having intricate shapes or a substantial number of relatively sharp corners.

These and other objects, uses and advantages of the invention will become apparent to those skilled in the art from the following description and claims and from the drawings in which:

FIG. 1 is a fragmentary diagrammatic top plan view of the apparatus of this invention on a reduced scale, the direction of movement of the glass being indicated by the arrows;

FIG. 2 is a fragmentary top plan view similar to FIG. 1 and on the same scale showing diagrammatically the equipment located in the production line downstream of the seamers;

FIG. 3 is a side elevational view on a reduced scale of the glass cutting apparatus of this invention, the pneumatic equipment being shown schematically;

FIG. 4 is an elevational view showing one of the motor-driven cutting units arriving at its stop position;

FIG. 5 is a horizontal sectional view of the castor wheel assembly taken on the line 5—5 of FIG. 4;

FIG. 6 is a vertical sectional view taken on the line 6—6 of FIG. 5 and on the same scale;

FIG. 6A is a vertical sectional view similar to FIG. 6 showing a modified form;

FIG. 7 is a top view of the apparatus in FIG. 4 with parts broken away;

FIG. 8 is a fragmentary top view showing the stop ramp;

FIG. 11 is a side elevational view of the cutting apparatus of FIGS. 4 to 9 with parts broken away;

FIG. 12 is a horizontal sectional view taken on the line 12—12 of FIG. 11;

FIG. 14 is a fragmentary view showing schematically the sensor switch assembly for detecting the presence of the glass;

FIG. 15 is a diagrammatic view showing the path of movement of the cutter units and the location of switch actuators along said path;

Figure 9:
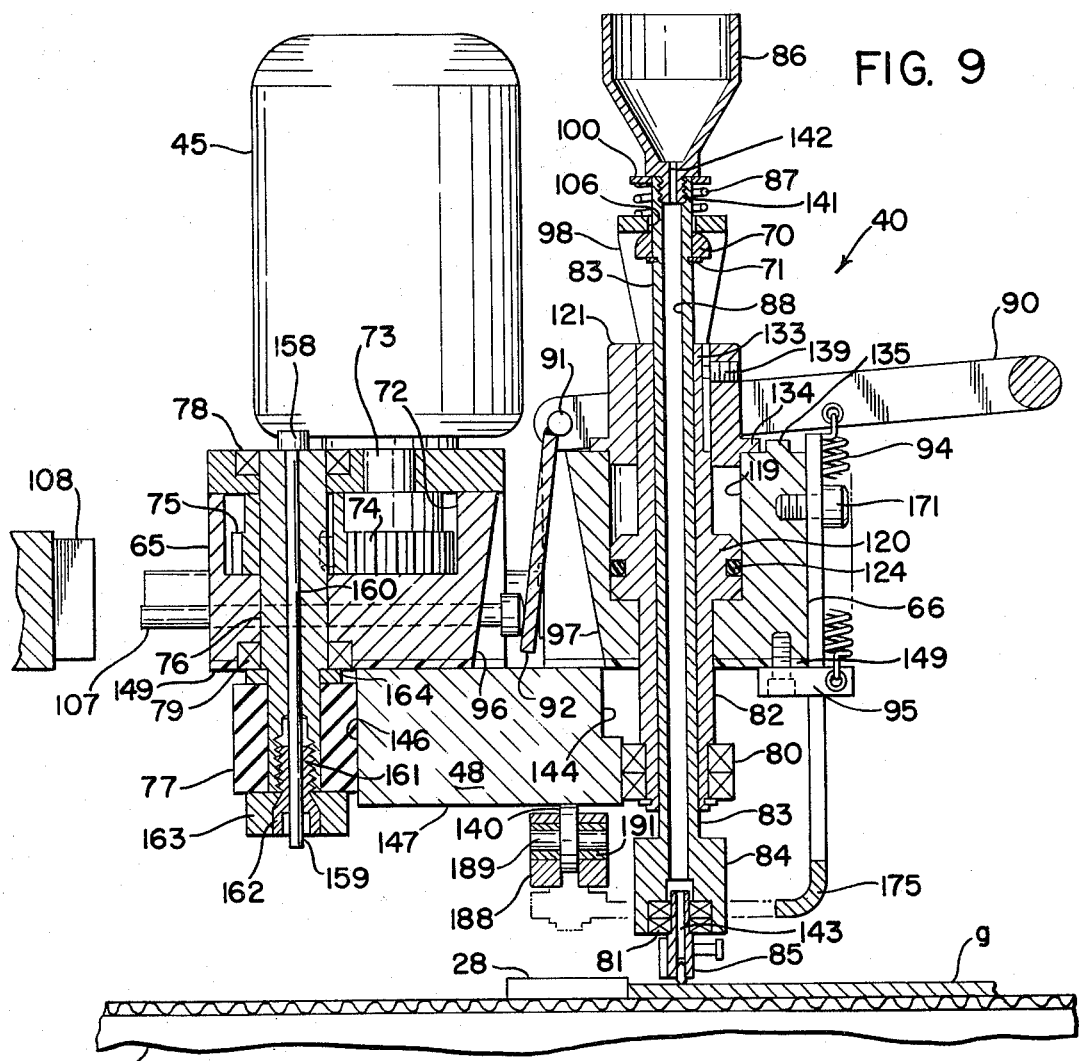
FIG. 9 is a vertical sectional view taken substantially on the line 9—9 of FIG. 7.

Referring more particularly to the drawings, in which like parts are identified by the same numerals throughout the several views, FIGS. 1 and 2 show schematically a factory production line incorporating the cutting apparatus of this invention. This apparatus includes a first conveyor section 1, a second conveyor section 2 perpendicular thereto and a third conveyor section 3 parallel to the section 1 for moving the glass panes in a direction parallel to the side edges of the panes.

A cutter assembly A is provided between the conveyor sections 1 and 2 to cut flat glass panes $p$ of a predetermined shape for use in making bent laminated windshields. After the upper surface of the glass is scored at the cutter assembly A, the outer marginal portions of the glass are removed at the break-off table 9 and dropped into the pit 10. The remaining glass pane or lite $p$ is placed on the conveyor section 2 and carried through a grinding or seaming apparatus B where the end edges of the glass are ground.

Figure 19:
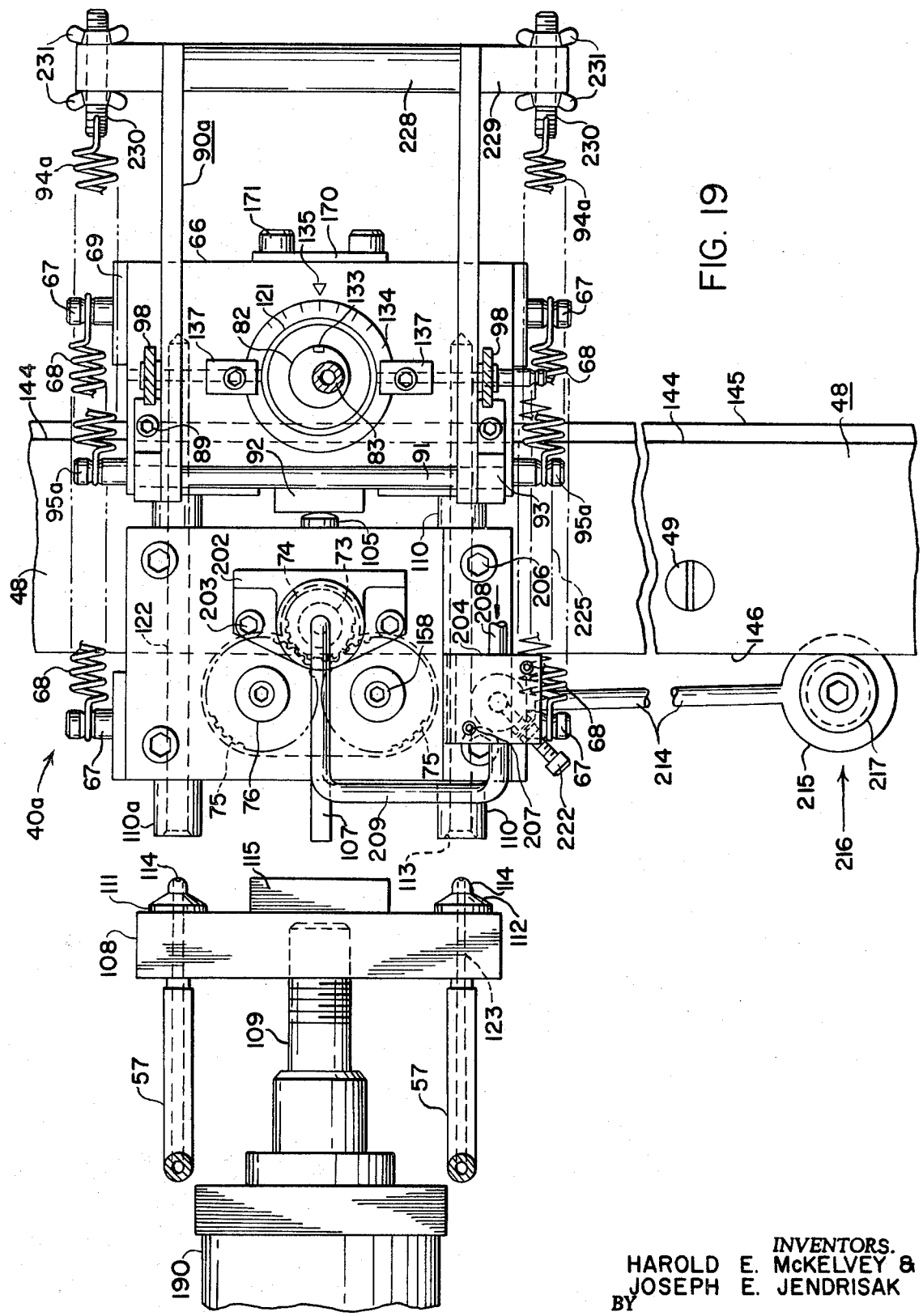
FIG. 19 is a top view of such modified form similar to FIG. 7.
Figure 20:
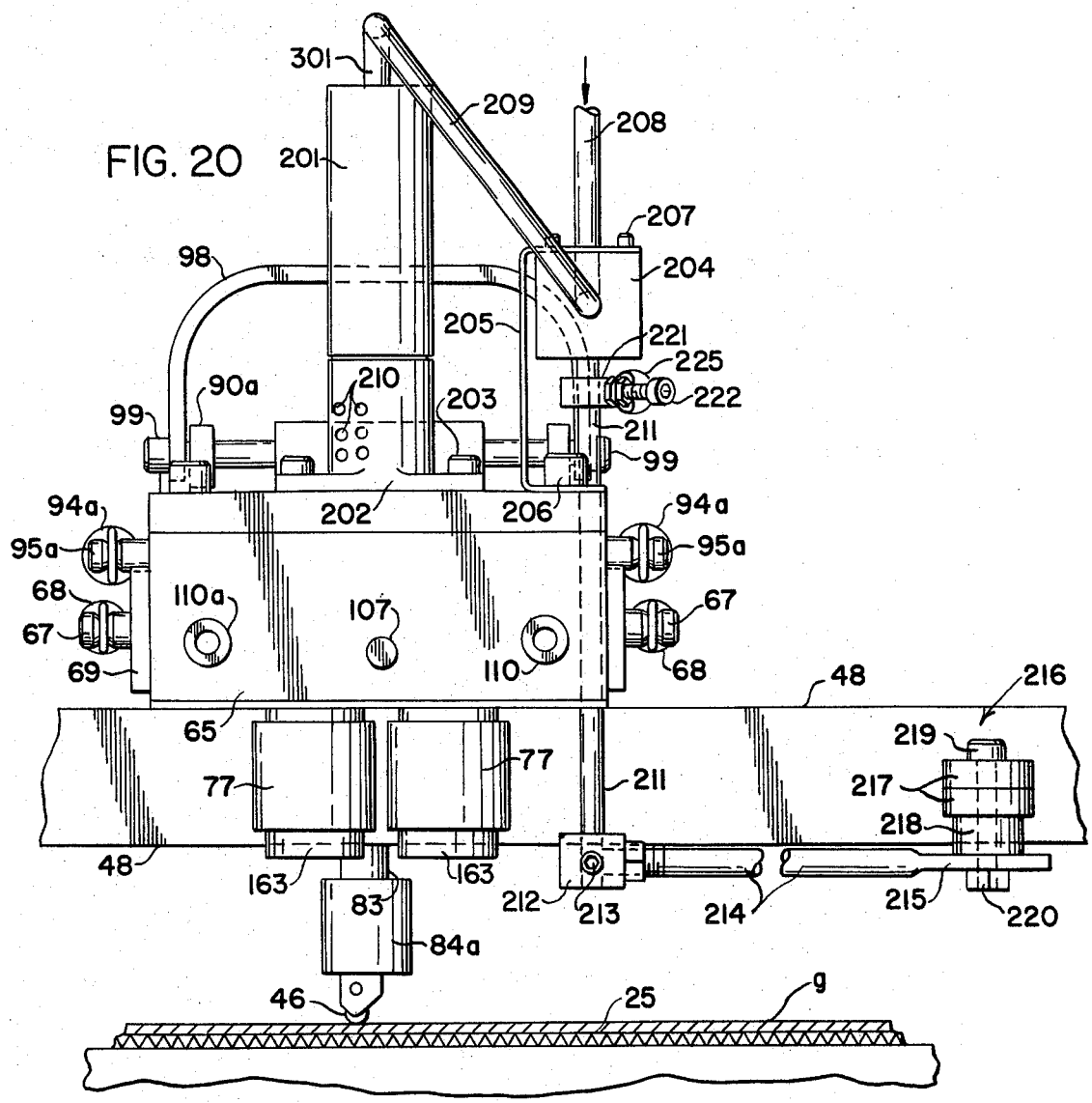
FIG. 20 is a fragmentary elevational view of the apparatus of FIGS. 16 to 19.

The glass leaving the seamers at B then moves on to a right-angle transfer section (not shown), which may be constructed like the transfer unit E disclosed in FIGS. 19 and 20 of U.S. Pat. No. 2,637,951. This transfers the pane $p$ to the conveyor section 3 which carries it through the seaming apparatus C to grind the side edges of the pane.

The seaming apparatus B and C may be of any suitable type. The seamers may, for example, be of the type disclosed in the following U.S. Pat. Nos. 2,637,951; 2,747,342; 2,837,876; 2,969,624; and 3,120,088. The seaming is preferably performed automatically, but the glass may also be ground or treated manually as disclosed in U.S. Pat. No. 2,706,876 or U.S. Pat. No. 2,725,691.

After the seaming is completed in apparatus C, the pane $p$ moves through a conventional washing section 5 where the glass fragments and foreign material are removed. The pane is dried before it leaves the section 5 and is then carried by the conveyor 3 through the inspection room 6 and the dusting room 7 to the section 8. A light 60 is provided in the inspection room. The glass from section 8 is delivered to a suitable glass bending apparatus (not shown), which may be of the type disclosed in U.S. Pat. Nos. 2,872,756; 3,103,430 or 3,189,426.

Before delivering the glass to the glass bending furnace, it is preferable to apply to the pane electrostatically a parting material as disclosed in U.S. Pat. No. 3,329,490. This is done in the dusting room 7 as the glass travels on the conveyor.

As shown in FIG. 1 the glass sheets to be cut may be delivered in boxes of carriers to a position near the table 16 for manual loading onto the table. The apparatus shown includes rectangular carriers 12 which are moved on the rollers 13 of the conveyor section 1 to a position adjacent the short conveyor section 14. The latter has horizontal rollers 15 to support one end of the glass sheet so that a single operator $a$ located near the corner of the table 16 can load said sheet manually onto the loading end of the table.

The cutter assembly A and associated equipment are shown in more detail in FIG. 3 and include a table 16 having a rigid steel frame 11 of welded construction which supports a flat top panel 17 in a horizontal plane. Said panel is held in its horizontal position on horizontal supports 18 of the frame which are supported from the floor by four vertical legs 19 at the corners of the frame which are interconnected by horizontal reinforcing members 20. The table 16 has a narrow rectangular portion 21 at the downstream end thereof and has a rectangular cut-out 22 at its opposite end as shown in FIG. 2.

A glass conveyor 24 (FIG. 3) is provided for feeding the glass over the table 16. Such conveyor includes two narrow endless belts 25 which are supported on pulleys 26 with their upper flights supported in narrow horizontal grooves in the flat horizontal upper surface of the panel 17. The frame 11 has rigid supports 27 at opposite ends of the table for supporting the pulleys beyond the ends of the panel 17.

Each of the belts 25 has a series of glass-engaging dogs 28 mounted thereon in regularly spaced relation, said dogs being spaced apart a distance greater than the width of the individual glass sheets $g$ and being engageable with the edges of the sheets as shown in FIG. 3 to feed them over the table. The upper surface of each belt 25 is preferably at a lower level than the glass supporting surface of the table so as to be out of contact with the glass, but the dogs 28 project above the glass supporting surface.

Suitable means are provided for advancing the belts 25 a predetermined distance in increments. As herein shown, such means includes a long pneumatic cylinder 29 having a relatively long horizontal piston rod 30 which is reciprocated under control of a limit switch 34 and a solenoid valve 35. Said valve has one position wherein fluid under pressure is admitted by line 36 to one end of the cylinder 29 and simultaneously exhausted from line 136 and a second position wherein such fluid is admitted by line 136 to the opposite end of the cylinder to retract the piston while simultaneously exhausting the line 36. A pusher block 31 is rigidly mounted on the end of the rod 30 and has a flexible leaf spring 32 mounted on the block for engaging the dogs 28 during retraction of the piston rod to deflect the block 31 downwardly and to permit it to move under the dog to the position shown in dot-dash lines in FIG. 3. When the piston rod is advanced, block 31 will engage the adjacent dog 28 and thereby effect feeding of the glass in the direction indicated by the arrows in FIG. 3.

The upper surface of the table 16 may be smooth and polished or may be covered by felt or other material which will not scratch the glass. The inlet end of the table 16 is preferably covered with a layer of felt having a marginal edge radially outwardly of the rectangular margin of the glass sheet $g$ shown in FIG. 1 and extending substantially from the end of the table 16 to the vicinity of the template ring.

As herein shown, a series of closely spaced holes 38 are provided in the panel 17 below the template 48 to direct air under pressure against or to apply a vacuum to the bottom surfaces of the glass sheets $g$ on the table. A shallow housing 37 is mounted below the plate 17 to provide a closed air chamber of large horizontal area below the holes 38, and an air line 392 connects such air chamber to a suitable sOurce of subatmospheric or superatmospheric pressure.

While it may be desirable to apply air under pressure to the housing 37 to blow foreign material off of the table and/or to support part of the weight of the glass as it is moved under the template ring, it will be understood the vacuum only may be applied. Such vacuum may be applied continuously or intermittently during operation of the machine and is preferably applied during cutting of the glass to help hold the glass in place relative to the template ring. As herein shown the application of the vacuum is controlled by a valve 52 whose position is determined by solenoids $r_6$ and $r_7$. In one position the valve blocks off the line 393 and connects the line 392 to air supply line 391, which is connected to an air pump, blower or other source of air under pressure. In its other position the valve 52 blocks off line 391 and places line 392 in communication with line 393, which is connected to a vacuum pump or other suitable sources of subatmospheric pressure, whereby a vacuum is applied to the air chamber at 37. If desired line 391 can be opened to atmosphere to eliminate the pressure during feeding of the glass or connected to a less powerful vacuum pump to reduce the vacuum during such feeding.

As herein shown, the cutter assembly A includes a two-track template ring 48 and a pair of motor-driven cutter units 40 mounted to move on one of the tracks to effect scoring of the glass sheet and cutting of the pane p therefrom. The rigid frame 11 of the table has a vertical standard 41 and a horizontal support bar 42 which supports an electric outlet 43 above the central portion of the table. A pair of flexible electric cords 44 extend from the outlet 43 to the electric motors 45 of the units 40 to provide power for said motors as they move along the template ring. Each unit 40 has a cutting roller 46 engageable with the upper surface of the glass sheet g to effect scoring of the sheet. The two cutter units 40 form a circumferentially continuous score line 47 at the margin of the windshield pane p as shown in FIG. 2, said score line corresponding in shape to the track of the template ring 48.

The template ring 48 is rigidly supported by a frame in a fixed horizontal position above the table 16 in a conventional manner so that the glass sheet g may be fed under the template ring as it moves along the length of the table 16 to the cullet breakout table 9. The supporting frame for the template ring may, for example, be of the type disclosed in U.S. Pat. No. 3,026,617 or other patents referred to above.

Each template ring has smooth flat horizontal upper and lower surfaces 148 and 147 to minimize friction during travel of the cutter units and has a smooth outer vertical surface 146 for engaginG the drive rollers of such units. The inner surface of the template rinG is stepped to provide two offset vertical cam surfaces 144 and 145 having a peripheral shape corresponding to the desired shape of the cut panes p and generally parallel to the surface 146. Said cam surfaces provide a matched doublet consisting of the inner and outer lites of a bent windshield, the outer lite being longer than the inner lite but having a similar shape and substantially the same width.

Usually the flat windshield panes p have a generally trapezoidal shape with rounded corners and sides which are straight or slightly curved. As herein shown, each pane p has generally straight side edges 53 and 54 and generally straight end edges 55 but the shape may vary considerably. It will be apparent from this description that the apparatus of this invention may employ template rings of intricate shape and may cut glass panels of many different sizes and shapes.

After the glass has been cut, it is advanced by the belts 25 from its position under the template ring to the projecting portion 21 of the table 16, which may be covered with felt like the loading portion at 22. The operators b and c then lift the scored glass sheet and place the central portion thereof on the break-out table 9. They then break-off the glass outwardly of the score line 47, allow the broken glass or cullet to drop into the pit 10, and place the cut pane p on the rollers 23 of the conveyor section 2. Because of the time required for the break out, the number of panes cut by the apparatus A need not be more than eight per minute.

An open bottom hopper with pyramidal walls 910 and a vertical skirt 911 is mounted in a fixed position on the factory floor below the break-off table to serve as a chute for guiding the cullet onto the belt 311 of a conveyor 310. The shirt may extend below the top of the vertical wall 313 or be connected thereto. In the structure shown herein, an angle 912 is welded at its ends to the two flat longitudinal portions of the skirt 911 and is welded to a pair of laterally spaced vertical channels 913 which support a lateral horizontal channel 914. The latter is welded to the channels 913 and to a pair of horizontal cross bars 915 which carry three spaced supporting bars 916 having a length less than the pane p. The bars 916 support the pane p inwardly of the score line 47 and directly above the hopper as shown in FIGS. 1 and 3. If desired the upper surface of the bars 916 may be covered with a layer of felt or other soft material.

A conveyor is preferably provided in a tunnel below the factory floor to remove the broken glass from the pit 10 and deliver it to a railroad car located outside the building. As herein shown, a conventional endless belt conveyor 310 extends into the pit for this purpose. If desired the rotating cylindrical roller 312 at the end of the conveyor may be positioned a substantial distance from the floor of the pit 10 so that the belt 311 is inclined downwardly but this is not necessary.

The details of the cutting units 40 are illustrated in FIGS. 4 to 12, which are drawn substantially to scale to facilitate an understanding of the invention. The construction of each cutter unit may vary considerably, but best results are obtained by use of two main blocks held together by springs so that the template ring is sandwiched between said blocks.

Each cutter unit 40 has a gear housing block 65 and cutter housing block 66, and each of said blocks has a pair of cylindrical bores to receive horizontally externally cylindrical push rods 110 and 110a. The end portions 102 of the rods have a press fit in the bores of the block 66 or are otherwise rigidly connected to the block. As herein shown a retaining ring 101 fits in an annular slot in each rod and engages the block 66 to prevent movement of the rod into the block.

A pair of annular busing sleeves 103 have a press fit in each of the cylindrical bores 104 of the block 65 and have smooth internal cylindrical surfaces to receive the guide rod 110 and 110a while permitting axial sliding of the rods so that the blocks 65 and 66 are held in alignment when they are moved toward and away from each other. A pair of helical springs 68 are provided to bias the blocks toward each other and to press the drive rollers 77 and the cam roller 80 against the template ring. The ends of the springs 68 are connected to pins 67, each having an enlarged circular base portion 69 rigidly connected to the block 65 or 66 by screws 117. The pins are located in alignment on opposite sides of each block.

The cutter block 66 may be provided with substantial weight to offset the weight of the motor 45 carried by the block 65 so that the cutter unit tends to remain upright on the template ring, and such weight can be adjusted if necessary. However, excessive weight should be avoided. It is preferable to provide a castor wheel 140 or other anti-friction means engaging the bottom of the template ring to steady the cutter unit and keep it level on the ring so that the weight of the cutter unit can be minimized and the pressure of the cutting tool on the glass will be more uniform.

The block 65 has an internal cavity 72 to receive the bottom end of the drive shaft 73 of the motor 45 and to receive the drive gear 74 and the two driven gears 75 of the gear reduction unit. The gear 74 is rigidly mounted on the shaft 73, and each of the gears 75 is rigidly mounted on a vertical shaft 76, which carries a cylindrical drive roller 77 at its lower end. The external surface of such drive roller is preferably formed of an elastic rubber such as an elastic polyurethane rubber. Each shaft 76 is journaled in bearings 78 and 79 carried by the block 65 and has a central bore which receives a hollow long rod 160 and an internally threaded counterbore which receives a hollow screw 161. The head 162 of the screw is tapered to fit a similarly tapered hole in the annular externally cylindrical ring member 163 so as to hold the ring member rigidly in place and hold the annular rubber drive roller 77 in place against the retaining washer 164. The rod 160 has a projecting portion 159 below the member 163 and a head 158 which may be raised to actuate a switch 165.

As shown in FIG. 4, the switch 165 has an actuator arm 166 with a roller engageable with the head 158 to effect opening of the normally closed switch. The switch is mounted on an L-shaped bracket 167 which is rigidly connected to the block 65 by screws 168.

The drive rollers 77 engage the vertical peripheral outer surface 146 of the template ring 48 and are held against said surface by cylindrical ball-bearing cam rollers or followers 80 at the opposite side of the ring. The cam rollers 80 are mounted for rotation on a hollow vertical eccentric shaft 82. Said eccentric shaft has an offset cylindrical bore of a size to receive a cylindrical vertical shaft 83 which extends through the rollers 80 and is integrally connected at its lower end to a cutter support block 84. A swivel support 85 is rotatably mounted in the block 84 to swing about a vertical axis by ball bearings 81. Such swivel support is conventional and supports the cutter wheel 46 so that it functions somewhat like a castor wheel.

Means are provided for moving the cam followers 80 vertically to shift them from one of the cam tracks 144 and 145 to the other. Such vertical shifting can be done mechanically in response to movement of the block 66 but is preferably accomplished by a separate motor in said block. Such means is preferably a pneumatic motor operated by an electrically controlled valve. As herein shown, a reciprocating piston fluid motor 118 is provided in a cylindrical counterbore 119 in the block 66 concentric to the shaft 82 and has a piston 120 integral with said shaft for reciprocating the cam followers 80 between a position in alignment with the cam track 145 and a position in alignment with the cam track 144. The piston has an annular groove which receives an O-ring seal 124 to engage the smooth inner surface of the counterbore 119.

The upper end of the pneumatic motor 118 is sealed by a large externally cylindrical annular adjusting collar 121 having a flat annular flange 134 resting on the flat horizontal upper surface of the block 66, the cylindrical portion of the collar 121 below the flange fitting in the counterbore 119. The collar has a threaded circular hole to receive a set screw 139 which projects into a vertical groove or keyway 133 to prevent rotation of the shaft 82 relative to the collar without interferring with reciprocation of the piston 120. One or more clamps 137 are mounted on the top of the block 66 by screws 138 located at the margin of the flange 134 which hold the clamps against said flange to prevent rotation of the collar 121. The collar has a knurled outer surface to facilitate manual turning of the collar when the screws 138 are temporarily loosened to permit adjustment. The flange 134 is marked with radial lines to provide a dial indicator which cooperates with a pointer 135 to indicate the position of the shaft 83 as best shown in FIG. 7. The pointer may be integral with or connected to the upper surface of the block 66.

The cylindrical shaft 83 has an external diameter substantially equal to the diameter of the eccentric vertical bore of the shaft 82 and can slide vertically in said bore, the block 84 being spaced from the bottom of the shaft 82 a distance sufficient to permit raising and lowering of the wheel 46 or other cutting tool. As herein shown, the hollow shaft 83 projects above the shaft 82 and has its upper end internally threaded to receive a threaded end portion 141 of a rigid funnel-shaped oil cup 86 having a small vertical passage 142 coaxial with and in communication with the central passage 88 of the shaft 83 and with the central vertical passage 143 of the swivel support 85. The cutting oil or lubricant thus flows from the oil cup through the passages 142, 88 and 143 to the cutting tool 46.

As herein shown, each of the cutter units 40 has an oiler 63 rigidly mounted above the table 16 by a suitable support including a supporting member 481 as shown in FIG. 3. Each oiler has a spout 64 located to discharge into the cup 86 of the associated cutter unit 40 when that unit stops at the end of each cycle, a solenoid R or R' being provided on each oiler to cause it to eject a predetermined amount of oil or cutting fluid each time the solenoid is energized. The preferred type of oiling system is illustrated in FIGS. 16 to 20.

The unique arrangement of the shafts 82 and 83 has many advantages. The eccentric arrangement with the dial indicator at 121 permits size adjustment from the top of the machine in a matter of seconds with no substantial loss of production due to "down time". Thus it is easy to adjust the length of the glass panes p being cut in the machine merely by turning the knurled sleeve 121 to move the shaft 83 and the cutting tool 46 radially relative to the cam follower 80.

The provision of a long vertical shaft 83 extending the full height of the cutter unit provides additional advantages. It not only provides a better way to lubricate the cutting wheel but also provides greater rigidity, greater accuracy and less wear. The aligned cylindrical bores of the block 66 and the collar 121 have substantially the same diameter as the externally cylindrical shaft 82 and accurately position the shaft while permitting reciprocation or rotation thereof.

It is preferable to provide each cutter unit with means for engaging the bottom surface 147 of the template ring to assist in holding the unit in its upright position when it travels around sharp corners of the template ring and when the cam roller 80 is disengaged from the ring. As shown herein an L-shaped supporting bracket 170 is rigidly and adjustably mounted on the cutter block 66 by a screw 171 which extends through a vertically elongated slot 172 in the wide rectangular portion 173 of the bracket. The bracket has an offset vertical portion 174 at its lower end and a bent portion 175 integrally connecting the vertical portion to an L-shaped horizontal portion 176 having a short leg portion 177 and a longer rectangular leg portion 178, which is offset to clear the cutter support block 84.

An antifriction means is carried at the other end of the horizontal portion 176 for engaging the smooth lower surface of the template ring. Such means may be a block 140a of Teflon, nylon or other suitable wear-resistant synthetic resin as shown in FIG. 6A shaped to slide on the smooth metal surface 147 or may be a castor wheel 140 as shown in FIGS. 5 and 6. The surfaces 147 and 148 are preferably smooth or polished metal but may be treated or coated with Teflon to facilitate sliding. As herein shown the bottom surface of the blocks 65 and 66 are attached to layers of Teflon or nylon to provide sliders 149 for engaging the upper surface 148 as each cutter unit 40 moves around the template ring.

As herein shown a vertical pin or shaft 179 is rigidly mounted on the portion 178 and has a circular disc portion or flange 180 resting on the portion 178. The shaft has annular grooves 181 which receive retaining rings or clips 182 at the top and bottom of the shaft. A ball bearing 183 is mounted on the shaft 179 with the inner sleeve 184 in engagement with the flange 180 and the retainer 182 and the outer sleeve 185 in engagement with a similar retainer 186 which fits in an annular groove of the swivel block 187. The ball bearing thus provides a rotatable support for the swivel block. The bifurcated portion or yoke portion 188 of the swivel block has cylindrical bushings 191 which receive the horizontal shaft 189 of the castor wheel 140. The supporting bracket 170 may be rigid or may be so shaped as to be under some stress when the castor wheel engages the surface 147, whereby the portion 176 acts somewhat like a cantilever spring to press the wheel 140 against the template ring.

Relative vertical movement is provided between the cutter shaft 83 and the table 16 to move the cutter wheel 46 out of contact with the glass and to permit feeding of the glass under the template ring. It is preferable to fix the vertical positions of the table and the template ring and to move the shaft 83 vertically relative to the shaft 82. As herein shown, the means for lifting the cutter wheel includes a U-shaped lever 90 having a horizontal pivot shaft 91 and a flat rectangular metal tab or flap 92 extending downwardly therefrom to a position where it can swing from a tapered recess 96 of the block 65 into a similar tapered recess 97 of the block 66. The shaft 91 is welded to the tab 92 and to the parallel legs of the lever 90 and has end portions pivotally mounted in supporting blocks 93 which are rigidly connected to the top of the block 66 by screws 89.

The tab 92 is engageable with the head 105 of a horizontal cylindrical rod 107 which fits in a cylindrical bore of the block 65 parallel to the push rods 110 and 110a and which projects a substantial distance from the block 65 like said push rods. A pair of helical springs 94 bias the lever 90 downwardly to press the head 105 toward the surface 96, each spring extending vertically between one leg of the lever 90 and a bracket 95 rigidly mounted on the bottom of the block 66.

A U-shaped metal member 98 is pivotally connected to the legs of lever 90 by a pair of axially aligned pivot pins 99 and has a central circular hole 106 to receive the cutter shaft 83. The horizontal central portion of the member 98 engages a rounded collar 70 which is supported on the shaft 83 by a retaining ring 71. A short helical spring 87 on the shaft is compressed between said horizontal portion and a circular washer 100, which fits on the shaft and engages a flat annular shoulder of the oil cup at 141. This provides a yieldable connection between the member 98 and the shaft 83, said member moving vertically during swinging of the lever 90. When the plunger 107 is forced inwardly to swing the tab 92, the lever 90 and member 98 raise the cutter shaft 83 to lift the cutter wheel out of contact with the glass.

Pusher means are provided for engaging the plunger 107 and the push rods 110 and 110a to lift the cutter wheel 46 and to separate the rollers of the follower 80 from the template ring so that they can be moved from one cam track to the other. As herein shown, each cutter station is provided with a pusher 108 mounted at the end of the reciprocating piston 109 of the pneumatic cylinder 190, which is rigidly mounted in a fixed position above the table 16. Each pusher has a flat central portion 115 which engages the plunger 107 and effects lifting of the cutter wheel 46 before the push rods 110 are moved so as to avoid scratching the glass when the block 66 is moved away from the template.

Each pusher 108 is adapted to engage both of the push rods 110 and 110a of the adjacent cutter unit 40 simultaneously and to force them inwardly, thereby overcoming the tension in the springs 68 and moving the block 66 away from the block 65 a substantial distance so that the cam rollers 80 are radially inwardly of the cam track 145 and free to move vertically. The push rods can project one-half inch or more from the block 65 when the cam rollers engage the cam track. If desired, a stop may be provided to limit the amount of movement of each pusher 108 so that the pusher stops before engaging the block 65, but this is not essential.

Each pusher is reciprocated by a pneumatic cylinder 190 under control of a two-position solenoid-operated valve 59 having a first position connecting line 61 to pressure supply line 224 and an air pump or other source of high pressure (not shown) while connecting line 62 to atmosphere and a second position connecting line 62 to supply line 224 while connecting line 61 to atmosphere. When in said first position the valve 59 admits air to the rear of the cylinder 190 to advance the piston while exhausting the front of the cylinder. When in said second position the valve retracts the piston while exhausting through line 61. If a glass sensing means is provided, the latter exhaust may be through line 61a as described hereinafter.

A pair of annular bosses 111 are provided on the pusher 108 in axial alignment with the push rods 110 and 110a, said bosses having frusto-conical outer surfaces 112 engageable with corresponding frusto-conical surfaces 113 of in the ends of the push rods. The engaging surfaces 112 and 113 may be accurately formed to provide a good seal or the bosses 111 may be made of elastic rubber to insure an air-tight seal. Each of said bosses is preferably provided with a rounded projection or nipple 114 which fits in the end of the air passage 122. Air passages 123 extend through the pusher 108 and the bosses 111 to carry air under pressure to one or the other of the passages 122 from flexible air hose 57 or 223.

Each of the push rods 110 and 110a is identical and has an annular groove 128 in its outer surface near the end of the cylindrical passage 122 and a pair of diametrically opposed ports 129 drilled through the rod. As shown in FIGS. 11 and 12, a horizontal passage 125 extends from the groove 128 of the rod 110a to the bottom of the counterbore 119 below the piston 120, and a vertical passage 126 extends from the groove 128 of the rod 110 to a horizontal passage 127 which is in communication with the top portion of said piston. The drilled passages 125 and 127 are closed at their ends by threaded plugs 130 and 131 to provide an air-tight seal.

The supply of air to the passages 123 of each pusher 108 is controlled by a solenoid-operated valve 58 which is located in a supply line 56 connected to an air line 61 or other source of high-pressure air. The valve 58 is biased by a spring toward its normal position wherein air is admitted from line 56 to the flexible line 57 leading toward push rod 110a (See FIG. 7) and is exhausted from the flexible line 223. A solenoid $r_5$ moves the valve to a second position wherein air is directed from line 56 to said flexible line 223 leading toward push rod 110 and is simultaneously exhausted from line 57.

Means are provided for bringing each cutter unit 40 to a halt at a predetermined position at the end of each cutting operation and for releasing the unit for travel in the same direction when the next cut is initiated. In one form of apparatus according to this invention, such mans comprises a spring-loaded stop ramp 152 having a pair of spaced trapezoidal stop blocks 153 rigidly mounted thereon with inclined surfaces 154 for engaging one of the cylindrical drive wheel members 163. A horizontal pivot pin 193 extends through the ramp into bosses 194 which are rigidly mounted on a horizontal plate 50 carried by the template ring. Screws 49 extend vertically through the template ring 48 into blocks 51, which are welded or otherwise rigidly connected to the plate 50 (See FIG. 11), to support the plate 50 on the template ring.

Figure 10:
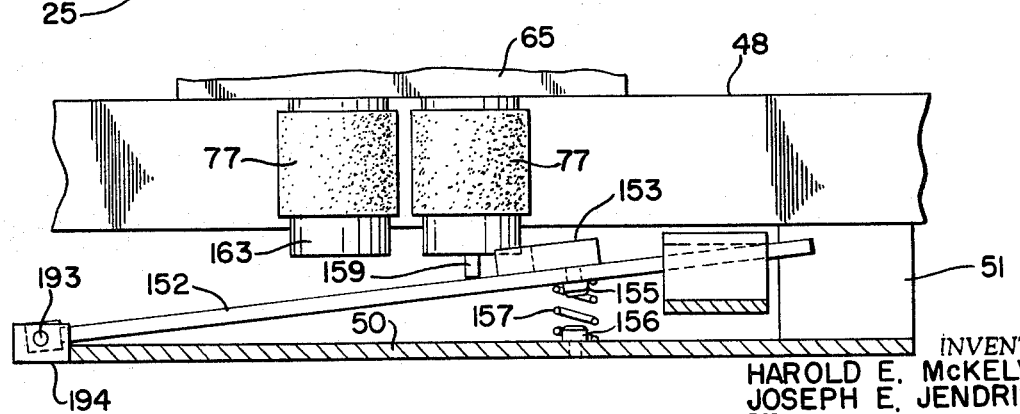
FIG. 10 is a fragmentary elevational view showing the stop ramp and lower portions of the cutter unit in their positions just before they contact.

A screw 155 is mounted on the metal strip forming the ramp 152, and a similar screw 156 is mounted directly below on the horizontal plate 50 to locate a helical spring 157 as shown in FIG. 10, said spring holding the ramp in a normal upper position so that the stops 153 will engage the member 163. The heads of the screws 155 and 156 are spaced apart to permit lowering of the ramp to a position wherein the stops are out of the path of movement of the members 163 and the ramp is out of contact with and out of the path of movement of the rod 160.

Means are provided for lowering the ramp 152 to initiate closing of the motor switch 165 and operation of the cutter motor. As herein shown a depressor plate 195 is pivotally mounted on the horizontal plate 50 in a position generally perpendicular to the stop ramp. Such plate has a block 196 rigidly connected thereto which receives a horizontal pivot pin 197 projecting into a pair of bosses 198 carried by the plate 50. The end portion 199 of the depressor plate rests on top of the ramp member 152 as shown in FIG. 4 so that the ramp is lowered to bring the heads of the screws 155 and 156 into engagement when the plate 195 is lowered by its solenoid 200. The solenoid is connected between the depressor plate and the horizontal plate 50 to effect such operation and is controlled by the electrical equipment shown diagrammatically in FIG. 13.

Automatic electrical controls are provided for the glass cutting machine of this invention. Means are provided for controlling feeding of the glass under the template by the main air cylinder 29 including a limit switch 34 and a valve 35 operated by solenoids $r_1$ and $r_4$. The feeding of the glass is correlated with other operations so that the cutter wheels are held in raised positions out of contact with the glass during such feeding.

Although timing means can be used, it is preferable to provide means to sense the presence of glass under the template and to prevent undesired operation of the cutters in the absence of the glass. This means includes a glass-sensing switch $S_4$ of a switch assembly 205 which is preferably maintained out of contact with the glass to avoid scratching of the glass. The glass-sensing switch may be retracted so as to be inoperable during glass feeding and advanced only at the end of the feed stroke, but it is preferable to employ a sensitive switch assembly 205 operated by air pressure, for example as disclosed schematically in FIG. 14.

Means are provided for automatically moving the cam follower 80 or otherwise changing the cutting path at the end of each cut so that the lengths of the pane are alternated. Such means includes the switch E, the ratchet switch e, and the solenoid $r_5$ of the spring-brased valve 58.

Means are provided for automatically starting and stopping movement of each cutter and for controlling the speed of the drive motor, which may be either pneumatic or electric. High-speed variable resistances $fv$ and $fv'$ are temporarily placed in series with low-speed variable resistances $sv$ and $sv'$ to reduce the speed of the cutter units as they approach the sharp corners of the template ring and/or the stop positions. Means may also be employed to slow down or deenergize each cutter at the sharp corners of the template ring such as means for opening the cutter switch 165 momentarily.

Novel means are provided for stopping each cutter at the end of its cut, terminating the supply of power to the cutter motor, and restarting the cutter in the same direction for a subsequent cut. This includes the stop ramp 152, the solenoid 200 for lowering the ramp and the motor-control switch 165 on the cutter unit, which opens in response to contact with the elevated ramp and closes when the ramp is lowered.

Figure 13:
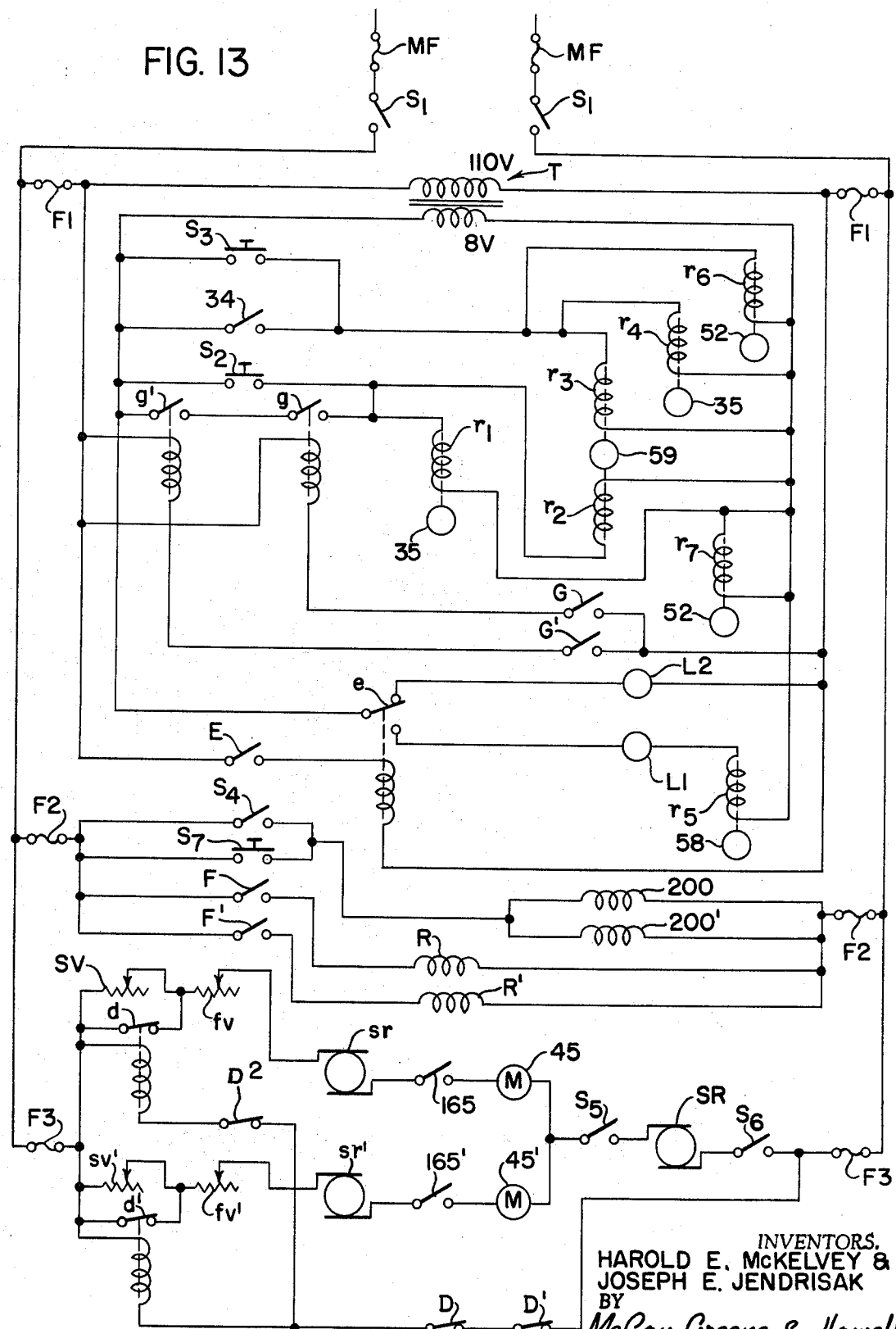
FIG. 13 is an electrical diagram showing the electrical equipment used in the cutting apparatus of FIGS. 2 to 12.

FIG. 13 illustrates diagrammatically one form of electrical control system which may be used in the practice of this invention. The circuits are protected by two main fuses MF and six auxiliary fuses F1, F2 and F3 and include a transformer T with an output of 8 volts and conventional slip rings SR, $sr$ and $sr'$ for the electric cutter motors 45.

Although the same numerals are used in the drawings to identify corresponding parts of the two cutter units 40, some identical parts are identified by priming the numeral where it is necessary in the electrical diagram to distinguish one cutter from the other or the elements which coact with one cutter from corresponding elements which coact with the other cutter.

After closing the main switches $S_1$ and placing a lite of glass $g$ onto the loading end of the table 16, the operator a (FIG. 1) depresses the start button $S_2$ to energize the solenoids $r_1$ and $r_2$ and $r_7$ and to operate the associated valves 35, 59 and 52. The valve 35 admits air or fluid under pressure through line 36 to the main cylinder 29 to start advancing movement of the piston rod 30 while the valve 59 admits air under pressure through line 61 to each cutter head cylinder 190 to move the pusher 108 against the rods 107, 110 and 110a. This elevates the cutting tool 46 and separates the cam follower 80 from the template ring 48 as a glass sheet $g$ is advanced under the template ring. The optional valve 52 is moved by the solenoid $r_7$ to a position blocking off line 393 and connecting line 391 to line 392.

Forward feeding of the glass sheet by the main cylinder 29 is terminated by the switch 34, which is momentarily closed by advancing movement of the pusher block 31. Thereupon the solenoids $r_3$, $r_4$ and $r_6$ are energized to actuate the valves 59, 35 and 52, respectively. The valve 59 then admits air to cylinder 190 through conduit 62 to retract the pusher 108 out of contact with the cutter unit 40, whereby the springs 68 pull the rollers of the cam follower 80 against the template and the springs 94 force the cutting tool 46 downwardly against the glass lite $g$. While this is going on, the valve 35 admits air to line 136 to retract the piston rod 30 (without moving the dogs 28) and the optional valve 52 connects the housing 37 to a source of vacuum or subatmospheric pressure. Such vacuum holds the glass against the table 16 as it is being cut and is maintained until the solenoid $r_7$ is later energized.

When retraction of the pusher 108 is initiated by the switch 34 and during such retraction, some of the exhaust air from the cylinder 190 is directed by valve 59 to the diaphram of the optional switch assembly 205 through conduit 61a. If the lite $g$ is properly positioned below the template ring 48, it will be adjacent the discharge end of line 61a and in the path of movement of such exhaust air (see FIG. 14) and will divert it through the branch line 61b to the diaphragm of the assembly 205 to effect closing of the switch 54. This momentarily energizes the solenoids 200 and 200' to lower the plate 195 and thereby lower the stop ramp 152 out of contact with the rod 160 (see FIG. 10). As the rod 160 drops away from the motor switch 165 (see FIG. 4) that switch closes to energize the direct-current cutter motor 45 which causes the cutter unit 40 to advance rapidly around the template ring. The switch $S_4$ quickly returns to its normal open position when the pusher 108 is fully retracted so that no more exhaust air passes through line 61a to said switch.

The variable resistors $fv$ and $fv'$ are adjusted to provide high-speed operation of the motors 45 and 45'. It is preferable to provide means for slowing the speed of the cutter units as they approach the sharp corners of the template ring or as they approach the stop ramps 152. In order to accomplish this two or more normally closed slow-down switches D and D' may be placed at predetermined locations around the template ring to be actuated by the cutter unit 40 as it passes such locations. Such switches may be connected in parallel or in series as in FIG. 13. Such switches may be located in advance of a sharp corner to slow down the cutter unit as it moves around such corner and are preferably also located a short distance before the stop ramp 152 to slow down the cutter before it strikes the stops 153.

When any one of the slow-down switches D and D' is actuated and opened by the passing cutter unit 40 to break the circuit, the timer switches $d$ and $d'$, which are normally held closed by said circuit, are opened for a predetermined short period of time, thereby placing the slow-speed variable resistors $sv$ and $sv'$ in series with the high-speed resistors $fv$ and $fv'$, respectively, to slow down the cutter motors.

As each cutter unit arrives at the stop ramp 152, the projecting end 159 of the rod 160 engages the ramp and is lifted to open the switch 165, thereby breaking the motor circuit and stopping the motor 45. The stops 153 engage the annular members 163 below the drive rollers 77 to bring the cutter unit to a complete stop in a predetermined position wherein the hollow rods 110 and 110a are in alignment with the frustoconical surfaces 112 of the pusher 108.

During the last few inches of travel of each cutter unit 40, it contacts switches E, F and G to effect momentary closing of such switches, the switch G being held closed as long as the cutter remains on the stop ramp.

Closing of the switch E causes the ratchet switch e to move from one of its two alternate positions to the other to energize one of the signal lights L1 and L2. The light L1 is a red light and the light L2 is a green light. The circuit containing the red light L1 also contains the solenoid $r_5$ controlling the valve 58. Such valve is spring biased so that it automatically returns to its normal position when the solenoid $r_5$ is deenergized. In such normal position the valve 58 admits air through conduit 57, rod 110a, and radial passage 125 to the lower end of piston 120 while exhausting air from the rod 110 to elevate the cam follower 80 to an upper position for engagement with surface 144 of the template ring. When the solenoid $r_5$ is energized, the valve 58 directs the air through hose 223, rod 110 and passages 126 and 127 to the top of the piston 120 while exhausting air from the rod 110a to lower the cam follower 80 to a position for engagement with surface 145 of the template ring. Thus, each time the cutter unit 40 engages the switch E and comes to rest, the cam follower 80 is automatically moved from one of the surfaces 144 and 145 to the other.

Closing of the switches F and F' energizes the solenoids R and r' of the oilers 63 to force a measured amount of cutting lubricant into the oil cup 86 each time the cutter unit stops. This insures proper lubrication of the cutting wheel 46 and facilitates accurate metering of the lubricant.

When the series-connected switches G and G' are both closed, the series connected timer switches $g$ and $g'$ are activated and closed after a short time delay. This insures that both cutters are in the proper stop position (The time delay is of course, not necessary if there is only one cutter unit 40). As soon as both switches $g$ and $g'$ are closed, the solenoids $r_1$ and $r_2$ are again energized to repeat the cycle automatically. The cycle will be repeated over and over so long as glass continues to be placed on the table 16.

Manual switches $S_2$, $S_3$, $S_5$, $S_6$ and $S_7$ may be provided for manual control, but it will be apparent that most of these can be omitted and that the electrical circuit may be modified considerably.

FIG. 15 illustrates diagrammatically a typical path of movement of a cutter unit 40 as determined by the cam track of the template ring 48 and typical positions of the two stop ramps 152. Said path is generally trapezoidal and has two generally straight portions 53a and 54a corresponding to the side edges of each cut pane p and two generally straight portions 55a and 55b corresponding to the inclined end edges of such pane. The rounded corners 253, 253a, and 254a correspond to the rounded corners of the pane.

As shown in FIG. 15 each of the switches D and $D^1$ is located a substantial distance (for example, 2 to 3 feet) from the associated stop ramp 152 so as to slow down the cutter unit before it strikes the ramp. Each of the switches E, F, F', G and G' is located near or adjacent the associated stop ramp so as to be closed or actuated as the cutter unit arrives at such ramp.

Where the rounded corners at 253 or 254 are relatively sharp and the cutter units are driven at relatively high speeds, it is desirable to provide means for slowing down the cutter units. This can be done by providing one or more additional switches in series with switch D. As herein shown a normally closed slow-down switch $D^2$ is located some distance before curve 253 and is actuated and opened to open switch d temporarily and slow down the cutter unit as it negotiates the curve 253. Similar slow-down means may be provided for curve 253a.

Each of the cutter units may also be slowed down at a sharp curve by actuating the switch 165 or another switch carried by the cutter unit to slow down or cut off the motor 45 using a suitable actuator located at or near such curve. Such actuator may be a ramp or projection similar to the ramp 152 but without stop means to interfere with cutter movement. A long ramp 252 similar to ramp 152 may be located near the curve 254 to engage the bottom portion of the rod 160 and open the switch 165 temporarily so as to cut off the motor 45 for a second or so and thereby slow down the cutter unit before it arrives at the curve. Similar slow-down means may be provided at the other curves if desired.

It will be apparent that the machine of this invention may be modified in various ways. For example, the motor 29 may be of a different type or may have its piston 30 rigidly connected to the belts 25 to cause them to reciprocate with the piston. The belts will not scratch the glass because they are below the top surface of the table. However, because the dogs 28 are not lowered below the glass during retraction of the piston 30 in the embodiment illustrated in FIG. 3, it is necessary to disconnect the piston 30 from the belts 25 in that embodiment and move the belts in only one direction.

While good results can be obtained when using a pair of cutter units 40, it is usually preferred to use only one cutter unit with each template 48 and to design that unit for high speed operation. When using an electric driving motor for the single cutter unit, a system of the type described above can be designed to cut more than six panes of glass per minute with only one cutter unit. However, in a production line of the type shown in FIG. 1, it is desirably to operate at a somewhat greater cutting speed, such as eight or more panes per minute, which is closer to the desired production speed. Such cutting speed can be obtained by replacing the electric motor with a small rotary air motor and otherwise reducing the overall weight of the cutter unit. The weight is usually at least 5 pounds and is preferably less than 10 pounds. FIGS. 16 to 20 illustrate a modified form of cutter unit 40a which may be provided with an overall weight of only 6 to 7 pounds and which can be constructed to cut the entire periphery of each pane p at a rate of more than eight panes per minute.

Figure 16:
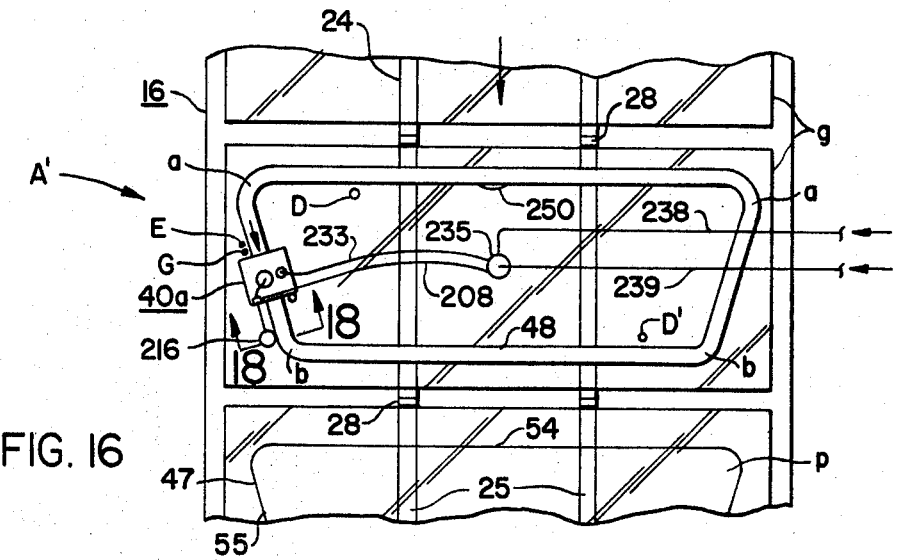
FIG. 16 is a fragmentary top view of a modified form of cutting apparatus on a reduced scale with parts omitted and parts shown schematically.
Figure 17:
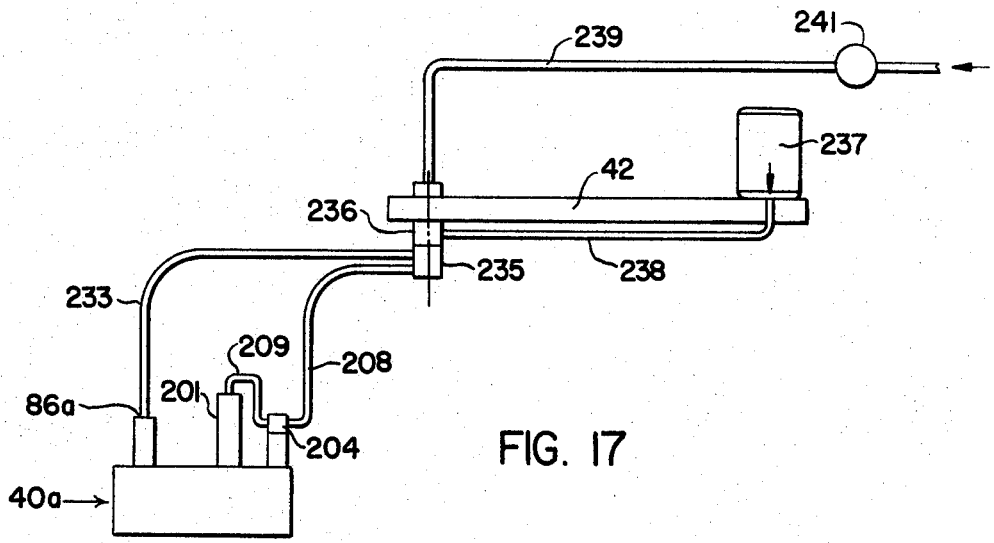
FIG. 17 is a schematic elevational view showing a portion of the apparatus of FIG. 16.

As shown in FIG. 16, the air-driven cutter unit 40a is mounted on the template ring 48 in a cutter assembly A' which is similar to the assembly A described above but has only one cutter unit and only one stop position. Except for the assembly A', the production line is the same as that of FIGS. 1 and 2. The oiling system of the assembly A' differs from that described above for the assembly A in that a steady drip feed is provided rather than a periodic injection system. Also, the flexible electric cord 44 of the assembly A is replaced by a flexible air supply hose 208 which rotates in unison with the oil supply hose 233. The hoses 208 and 233 may be taped together, if desired.

Figure 18:
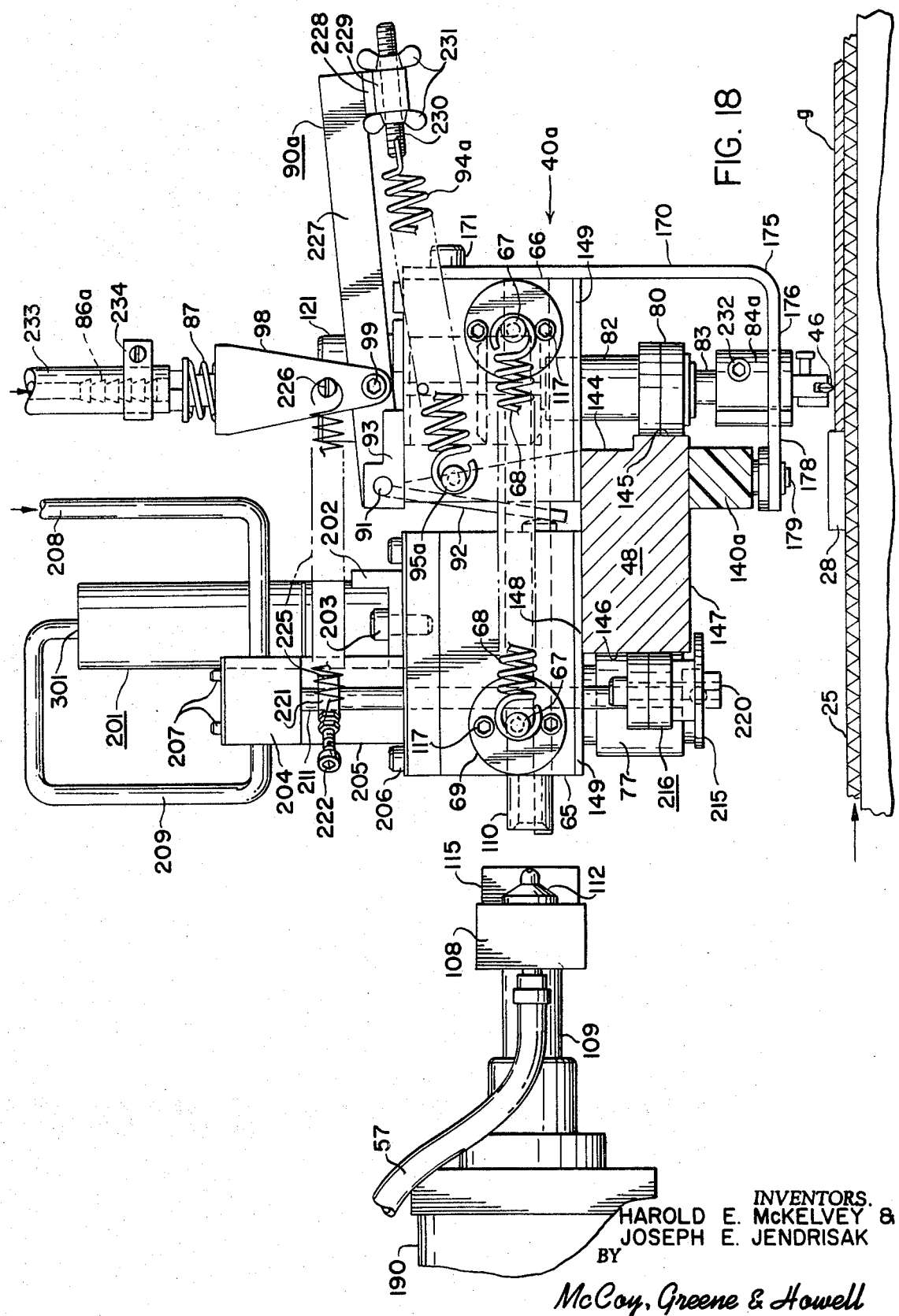
FIG. 18 is an elevational view similar to FIG. 4 taken substantially on the line 18—18 of FIG. 16.

The cutter unit 40a of FIGS. 18 to 20 is essentially the same as the unit 40 of FIGS. 4 to 12 except for the rotary air motor 201 and associated parts, the removable cutter support sleeve 84a, and the spring assembly at 94a. The parts are shown substantially to scale in FIGS. 18 to 20 to facilitate an understanding of the invention, but it will be understood that the size and shape of the parts may vary considerably and that the gearing between the air motor and the drive rollers 77 may be modified or reduced in size depending on the type of air motor being used.

In a cutter unit 40a of the type shown herein, it is preferable to employ a conventional rotary vane-type air motor having an air inlet 301 at the upper end and a series of exhaust ports 210 at the lower end. Such motor may, for example, be a Gardner-Denver rotary air motor which operates at around 1,000 to 1,500 revolutions per minute and has a cylindrical housing with a diameter of 1 inch to 2 inches and a length of 8 to 12 inches. Such a motor may weigh substantially less than 1 pound and a small fraction of the weight of an electric motor of comparable power.

As herein shown, the cylindrical housing of the rotary vane air motor 201 is rigidly mounted in a vertical position on the block 65 by means of a motor bracket 202 and cap screws 203. The flow of air to the motor is controlled by a conventional rotary speed control valve 204 which is supported on a U-shaped sheet metal bracket 205 with the valve rod 211 in a vertical position. The bracket is fixed to the block 65 by cap screws 206 and is fixed to the flat upper face of the valve housing by a pair of small screws 207.

Air under a suitable pressure, such as 50 to 150 pounds per square inch, flows from the air supply hose 208, through the valve 204 and the flexible intermediate air hose 209 to the inlet 301 of the air motor and exhausts at the ports 210. Such air pressure in the line 208 is preferably about 80 to 100 pounds per square inch in an air motor of the type shown.

The valve 204 is opened or closed in response to turning of the valve rod 211 which extends down through the block 65 to an internally cylindrical removable mounting block 212 which fits on the lower end of the rod and is rigidly held in place by a set screw 213. A horizontal control arm 214 is rigidly supported by the block 212 and has a flattened circular end portion 215 which supports a cam follower 216. The follower has a pair of rollers 217 (similar to the cam rollers 80), which are mounted to rotate about a vertical axis and to engage the vertical cam surface 146 of the template ring 48. The rotatable mounting includes a cylindrical collar 218 mounted on the flattened portion 215, a vertical shaft bolt 219, and a nut 220 screwed onto the bolt.

The cam follower 216 is biased toward the cam surface 146 by suitable spring means, such as a helical spring 225 or the like. As herein shown, a collar 221 is rigidly mounted on the valve rod 211 below the valve 204 and held in place by a screw 222 which receives one end of the spring 225. The other end of the spring is connected to a screw 226 mounted on the U-shaped member 98 (FIG. 18). The spring holds the follower 216 against the template surface 146 and causes it to follow the template.

As shown in FIG. 16, the template ring 48 has two moderate curves b and two relatively sharp curves a. Because the follower 216 extends a substantial distance (for example, 8 to 10 inches) ahead of the drive rollers 77, the control arm 214 will anticipate the curve a or b before the cutter unit arrives at the curve and will turn the valve rod 211 to reduce the air flow through the valve 204 in accordance with the sharpness of the curve. Additional speed controls may also be provided as described hereinafter.

The power may be transmitted from the shaft 73 of the drive motor 201 through the gearing 73-75 to the drive roller or rollers 77 of the unit 40a in the same manner as in the unit 40 described above. The size and type of gearing will depend on the type of rotary air motor being used. The springs 68 of the unit 40a hold the rollers 77 and the cam follower 80 against the template ring in the same way, and the antifriction means 140a engages the flat horizontal bottom face 147 of the ring in the same way to maintain the unit 40 in an upright position at all times with the lower faces of the blocks 65 and 66 level and substantially in the same horizontal plane as the top surface of the template ring. Such antifriction means may be a castor roller 140 or the like (see FIG. 9) but is preferably a block of Teflon, nylon or other wear resistant plastic material.

When cutting the glass sheets g, it is preferable to select a cutting pressure most suitable for the job. With a thick glass, the force on the cutter wheel 46 may be as high as 18 pounds or several times the overall weight of the cutter unit 40a. The antifriction means 140 or 140a prevents tilting of the cutter unit when such a high force is applied and makes it possible for the cutter to function at the usual high speeds and to apply a generally uniform cutting pressure throughout the cycle.

In order to provide a more uniform pressure on the cutting wheel and to facilitate adjustment of such pressure, the spring means (94-95) of the cutter unit is preferably replaced with the spring means shown in FIGS. 18 to 20 which includes a pair of helical springs 94a, a pair of spring supporting pins 95a, and a pair of adjustable spring-supports 230 in the form of externally threaded studs. The location of the pins 95a close to the pivot shaft 91 provides a more uniform spring pressure.

As herein shown, the lever 90 is replaced by a U-shaped lever 90a having straight side-portions 227 rigidly connected to a transverse bar 228 which has mounting blocks 229 rigidly mounted on its opposite ends. A stud 230 extends through each block 229 and is rigidly held in adjusted positions by a pair of wing nuts 231. The stud has a small hole therein to receive one curved end portion of the spring 94a, the opposite end portion being mounted on the pin 95a so that the spring is maintained under tension.

Periodically it is necessary to replace the conventional cutting wheel 46. Such removal can be facilitated by employing a split collar 84a held in place by a set screw 232, but this is not essential.

In order to provide the cutting wheel with maximum life, it is preferable to provide a continuous or steady-drip oiling system, such as the one shown in FIGS. 16 to 20. In this system, the oil cup or funnel 86 may be replaced by a conventional externally ribbed tubular metal connector 86a for receiving a flexible oil-resistant rubber hose 233. A suitable clamp 234 may be provided to hold the end of the hose in place. The opposite end of the hose is connected to a suitable air-oil rotating union 235, which also receives the end of the air hose 208. The union 235 is rotatably mounted in an elevated position above the table 16 on a supporting block 236 carried by free end of the cantilever arm 42. Said block replaces the support 43 of the apparatus A of FIG. 3.

The oil flows to the union 235 from a stationary oil supply tank 237 mounted on the fixed end of the arm 42 through a conduit 238, and air under pressure flows to the union through an air supply conduit 239 having a suitable solenoid-operated control valve 241. During rotation of the union 235, the oil hose 233 remains in communication with the conduit 238 and the air hose 208 remains in communication with the conduit 239. The air flow to the motor 201 is continuous until it is shut off by the valve 241. The oil flow from the tank 237 may be continuous or may be a steady drip. The amount of oil needed for lubrication of the cutting wheel is relatively small.

Figure 21:
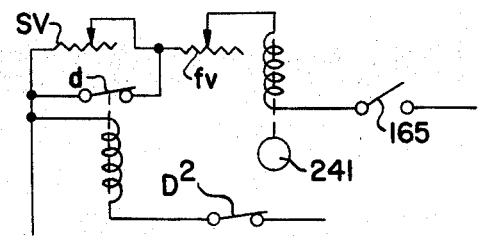
FIG. 21 is a fragmentary schematic diagram illustrating some of the changes which may be made in the electrical control system of FIG. 13 to accommodate the modified form of FIGS. 16 to 20.

The electrical system employed with the apparatus A' and the cutter unit 40a may be essentially the same as shown in FIG. 13 is two units 40a are employed with the one template ring 48 and the slip rings of the electric motors 45 are replaced with solenoid-operated control valves 241. It is preferable, however, to use only one cutter unit 40a and to omit the superfluous half of the electrical system shown in FIG. 13 as will be obvious to those skilled in the art from this description. FIG. 21 illustrates a portion of such an electrical system in which the slip rings SR, sr and sr' are replaced in the circuit by the solenoid of the control valve 241. It will be understood that the switches D, D', E and G may be retained to slow down or stop movement of the cutter unit. These may be located generally as shown in FIG. 16 to engage the cutter unit as it passes. A slow-down switch could also be provided ahead of the antenna notch curve 250 (FIG. 16) if the pane p is to be provided with such a notch. The switches F and F' and the solenoids R and R' of the oilers 63 would, of course, be unnecessary and could be omitted.

The operation of the cutting apparatus A' of FIGS. 16 to 21 and the associated electrical controls (see FIG. 13) will be obvious to those skilled in the art from the foregoing description of the apparatus A of our copending application, Ser. No. 740,202, filed June 26, 1968, which is incorporated herein by reference. The pneumatic or electric motor and the solenoid-operated valves or switches used in the apparatus may be of a conventional type. Various types of conventional air motors may be used. For example, the air motor may be of the type shown in one or more of the following U.S. Pat. Nos. 2,401,190; 2,423,957; 2,541,306; 2,570,009; 2,575,524; 2,575,640; 2,830,560; 2,905,149 and 3,080,851.

The cutter unit 40a is shown in the stop position in FIG. 16, and it will be apparent that the stop ramp 152 or other suitable stop means may be employed to locate the cutter unit accurately at the end of each cycle. However, the air motor 201 provides a rapid cushioned deceleration of the unit 40a when the valve 241 is closed so that the stop ramp is no longer needed and may be replaced with a conventional stop.

It will be understood that the above description is by way of illustration, rather than limitation, and that, in accordance with the provisions of the patent laws, variations and modifications of the specific methods and devices disclosed herein may be made without departing from the spirit of the invention.

Having described our invention, we claim:

1. In an apparatus for cutting glass sheets having a glass-supporting table (16) and a template ring (48) supported above said table having an outer peripheral surface (146) and an inner peripheral surface providing one cam track (144) with a shape corresponding to the outline of a windshield pane, a cutter unit (40) adapted to ride around said ring, said cutter unit comprising: a block (65) rotatably supporting an external drive roller (77) for engaging said outer peripheral surface, motor-drive means in said block for rotating said drive roller, a cutting tool (46) for engaging the glass, means for supporting said cutting tool comprising an antifriction cam follower (80) for engaging said one cam track while the drive roller (77) engages said outer peripheral surface to locate said cutting tool and cause it to follow the outline of said one cam track, means (68) on said block for pressing said cam follower toward said drive roller, means (110) for moving said cam follower away from said drive roller to release the cam follower from the cam track, and means (118) for moving said cam follower (80) vertically relative to said block from a first position for engagement with a different cam track (145) when said cam follower is released from said one cam track.

2. A cutter as defined in claim 1 wherein said last-named means comprises a pneumatic cylinder (118) on the cutter unit having a piston (120) which reciprocates vertically and a vertical piston shaft (82) which supports said cam follower (80).

3. A cutter as defined in claim 2 wherein said piston shaft (82) has a cylindrical bore that slidably receives a vertical cutter shaft (83) which supports said cutting tool (46), and means (107, 90, 98) are provided for moving said cutter shaft axially relative to said piston shaft.

4. A cutter as defined in claim 1 wherein the means for moving the cam follower to release it from the cam track includes a push rod (110) mounted to slide in said block and wherein means (107) are provided on said block to effect lifting of said cutting tool relative to said block when said push rod is moved in a direction toward said cam follower.

5. A cutter as defined in claim 1 wherein an arm (170) extends downwardly from the cutter unit (40) to support an antifriction member (140, 140a) for engaging the bottom surface (147) of the template ring.

6. A cutter as defined in claim 1 wherein a second block (66) is provided on each unit (40) adjacent said first-named block (65) to support said cam follower (80), said blocks being mounted on parallel push rods (110 and 110a) to slide toward and away from each other, spring means (68) are provided for biasing said blocks toward each other and for pressing the drive roller (77) and the cam follower (80) against the template ring (48), said push rods projecting outwardly from said first-named block (65) to provide the means for releasing the cam follower from the track.

7. A cutter as defined in claim 6 wherein said means for moving the cam follower vertically is a pneumatic reciprocating piston motor (118) operably connected to said cam follower (80), and passage means (122) are provided in said push rods for supplying air to and exhausting air from said motor.

8. A cutter as defined in claim 6 wherein a rod (107) is slidably mounted in said first-named block (65) to be actuated when said push rods (110 and 110a) are moved into the first-named block (65) to release the cam follower (80) from the cam track (144 or 145), and means (90, 98) are provided for raising the cutting tool (46) in response to movement of said rod (107).

9. In an apparatus for cutting glass sheets having a glass-supporting table, means for repeatedly feeding sheets of glass to a predetermined cutting position on said table, a cutter unit having a cutting tool for scoring the glass and having a cam follower, a template ring supported above said table and having a peripheral cam track for engaging the cam follower to guide said cutter unit around said ring to score the glass, and motor means for driving the cutter unit in one direction around said ring, the improvement which comprises a stop ramp having stop means for engaging each cutter unit to bring it to a halt at a predetermined stop position adjacent said template ring, means mounting said ramp to swing from an advanced position for engagement with the cutter unit to a retracted position out of the path of movement of said unit, means on each cutter unit engageable with said ramp to discontinue driving of the cutter unit by said motor means, means for automatically raising said cutting tool when the cutter unit is in contact with said ramp, means for initiating feeding of the glass when the cutting tool is raised and for lowering the cutting tool after the glass is in said cutting position, and means for automatically moving said stop ramp to said retracted position to release the cutter unit and restart the driving of the cutter unit around the ring in said one direction by said motor means after lowering of said cutting tool.

10. Apparatus as defined in claim 9 wherein each cutter unit has a drive roller engaging the template ring with a hollow vertical shaft, said drive roller being driven by said motor means and having a vertical plunger extending through said shaft for operating said switch means, said plunger projecting downwardly and being engageable with said stop ramp, said drive roller being engageable with the stop means of said ramp.

11. Apparatus as defined in claim 9 wherein pusher means are provided at each stop position for engaging the cutter unit to raise said cutting tool and fluid motor means are provided for operating each said pusher means.

12. Apparatus as defined in claim 11 wherein said template ring has a second peripheral cam track below said first-named cam track, said cam follower is mounted to move toward and away from the template ring into and out of engagement with either of said cam tracks, and means are provided for automatically moving said cam follower from a position in horizontal alignment with one cam track to a position in horizontal alignment with the other cam track when said pusher means is advanced to raise said cutting tool.

13. A cutter as defined in claim 1 wherein an air motor is provided on said block for driving said drive roller.

14. Apparatus for cutting windshield glass comprising a glass-supporting table, a template ring having two adjacent peripheral cam surfaces with curved shapes corresponding to that of desired windshield panes, said ring being supported above said table to permit feeding of glass sheets between the table and the ring, at least one cutter unit mounted on said template ring having at least one drive roller engaging said ring and a motor for driving said roller to cause movement of the cutter unit along the periphery of said template ring, each cutter unit having a glass-engaging cutting tool below said template ring and a cam follower engaging one of said peripheral cam surfaces to locate said cutting tool and cause it to follow the outline of that peripheral cam surface, and means on each cutter unit for automatically moving said cam follower vertically from a first position for engagement with one of said peripheral cam surfaces to a second position for engagement with the other of said cam surfaces each time the cutter unit is stopped.

15. Glass cutting apparatus as defined in claim 14 wherein a fixed station is provided for each cutter unit along the periphery of said template ring, said last-named means comprises a fluid motor mounted on the cutter unit, stop means are provided at each station for causing the associated cutter unit to stop at a predetermined location, and means are provided at each station to supply fluid under pressure to said fluid motor to effect vertical movement of said cam follower each time the cutter unit stops at its station.

16. Glass cutting apparatus as defined in claim 15 wherein said drive roller engages a peripheral surface of said template ring on the side of said ring opposite said peripheral cam surfaces, spring means biases said cam follower toward said drive roller to hold said roller against the template ring and to maintain the cutter unit in an upright position, and means are provided to move the cam follower away from the template ring each time the cutter unit stops at its station.

17. Glass cutting apparatus as defined in claim 16 wherein said last-named means comprises a hollow push rod mounted on each cutter unit, a motor-driven pusher mounted on the table at each station for engaging said push rod, and means on each cutter unit responsive to movement of said push rod to separate the cam follower from the template ring, and wherein means are provided to supply fluid under pressure through said push rod to said fluid motor while the cutter unit is at its station to effect vertical movement of the cam follower.

18. Glass cutting apparatus as defined in claim 17 wherein two stations are provided at locations at the periphery of said template ring, one of said cutter units is provided at each station, and means are provided for causing each cutter unit to move about half way around the template ring from one station to the other each time a glass pane is cut on said table.

19. Glass cutting apparatus as defined in claim 17 wherein an antifriction member is mounted on each cutter unit and engages a bottom surface of said template ring to assist in maintaining the cutter unit in an upright position as it travels on said ring.

20. Glass cutting apparatus as defined in claim 17 wherein said template ring has a smooth upper surface and each cutter unit has a slider mounted thereon for engaging said upper surface to support the cutter unit on the template ring, said slider being formed of a non-metallic antifriction material.

21. Glass cutting apparatus as defined in claim 14 wherein a fixed station is provided for each cutter unit, each cutter unit has two blocks mounted on horizontal push rods to move toward and away from each other, one block having one or more drive rollers, a motor, and gear means for connecting the motor to said drive rollers, the other block supporting said cam follower and said cutting tool and having a pneumatic motor with a piston connected to said cam follower to move it vertically, spring means are provided for biasing said blocks toward each other to clamp said template ring between said drive rollers and said cam follower, motor-driven pusher means are provided at each station to effect lifting of the cutting tool and to engage said push rods to separate said blocks and move the cam follower out of engagement with the template ring, and means are provided at each station to supply air under pressure to said pneumatic motor after the cam follower is released from the template ring.

22. Glass cutting apparatus as defined in claim 21 wherein the glass cutting tool is supported by a vertical hollow shaft located within the cam follower and movable vertically independently of said follower and wherein means are provided to direct cutting fluid through said hollow shaft to said cutting tool.

23. Glass cutting apparatus as defined in claim 21 wherein the glass cutting tool is supported by a vertical shaft mounted in eccentric relation within a second vertical shaft of larger diameter which carries said cam follower, means are provided for mounting said second shaft to turn about its vertical axis to adjust the position of said cam follower relative to said cutting tool, and means are provided for holding said second shaft in its adjusted position.

24. A cutter unit (40) comprising two main blocks (65 and 66) mounted on guide means (110 and 110a) to move toward and away from each other, spring means (68) biasing the blocks toward each other, at least one template-engaging drive roller (77) carried by one block (65) and projecting downwardly below the bottom of said block, motor-driven gear means (74, 75) in said one block for rotating said drive roller, a vertical shaft (82) mounted in the outer block (66) having a template-engaging cam follower (80) mounted thereon, means (83) carried by said vertical shaft for supporting a glass cutting tool, and means (120) in said other block (66) for moving said shaft vertically to shift said cam follower (80) from a first cam-track-engaging position to a second cam-track-engaging position.

25. A cutter unit as defined in claim 24 wherein said vertical shaft (82) has an eccentric vertical bore which receives a cylindrical shaft (83) that is connected to said cutting tool (46) and means (121) are provided for rotating said vertical shaft (82) to adjust the position of the cutting tool relative to said cam follower.

26. A cutter unit comprising a first housing member (65) having a motor (45) and gear means (74, 75) for driving a template-engaging drive roller (77), a cutter block (66), spring means (68) connecting said housing member and said cutter block, an externally cylindrical eccentric shaft (82) mounted in said block for rotation about a vertical axis and projecting downwardly therefrom, a template-engaging cam follower (80) rotatably mounted on the lower end portion of said shaft, said shaft having an offset vertical bore containing a long vertical shaft (83) which projects from opposite ends of said eccentric shaft, a cutting tool (46) connected to the lower end portion of said long shaft, means (118) connected to said long shaft to raise the cutting tool relative to said block, and means (121) for holding said eccentric shaft in different angular positions to permit adjustment of the position of the cutting member relative to said cam follower.

27. A cutter unit as defined in claim 26 wherein pneumatic motor means (118) are provided in said block (66) to move the cam follower (80) vertically between two cam-track-engaging positions.

28. A cutter unit as defined in claim 26 wherein said long shaft has a central oil passage in communication with the cutting member, and wherein means are provided at the top of said long shaft to direct oil into said oil passage.

29. A cutter unit as defined in claim 26 wherein a rotatable dial (121) is connected to the upper portion of said eccentric shaft to rotate with said shaft, and releasable holding means (137) are provided for holding said eccentric shaft in adjusted positions.

30. Apparatus for cutting windshield glass having a glass-supporting table, means for repeatedly feeding sheets of glass to a predetermined cutting position on said table, a template ring supported above said table having an outer peripheral surface and an inner peripheral surface comprising an upper cam track and a lower cam track, said cam tracks corresponding in shape to the outline of a windshield pane, a cutter unit adapted to ride in one direction around said template ring and having at least one drive roller for engaging said outer peripheral surface and a cam follower for alternately engaging one or the other of said cam tracks, said cam follower supporting a glass cutting tool, a motor on said cutter unit for driving said drive roller, spring means for biasing said cam follower toward said drive roller to hold the roller against the template ring, means for stopping the unit in at least one predetermined stop position, means for raising the cutting tool and for moving the cam follower away from the drive roller to free the cam follower from the cam track including a pneumatic cylinder having a piston member which is advanced into engagement with the cutter unit when it is located at said stop position, start means for energizing said motor means to cause feeding of the glass and for simultaneously energizing said pneumatic cylinder to advance the piston and raise the cutting tool while causing movement of the cam follower vertically from a position in alignment with one cam track to a position in alignment with the other track, means for thereafter retracting said piston to lower the cutting tool and to cause said spring means to move the cam follower against the adjacent cam track, and for starting said motor to drive the cutter unit around the template ring, means engageable with the cutter unit for deenergizing said motor when it approaches said stop position and for initiating operation of said start means to repeat the automatic cycle, and means for reversing the direction of movement of the cam follower each time the cutter unit completes one cycle.

31. Apparatus as defined in claim 30 wherein a closed chamber is provided below the template ring and below the surface of the table and a multiplicity of air holes are provided in the table surface above said chamber which engages the glass to permit movement of air into said chamber, and valve means are provided for connecting said chamber to a source of subatmospheric pressure to apply a vacuum to the glass sheet below said template ring to hold the glass as it is being cut.

32. A cutter as defined in claim 1 wherein a second external drive roller (77) is carried by said block (65) for engaging said outer peripheral surface (146), an arm (170) extends downwardly from the cutter unit (40) to support an antifriction member (140, 140a) for engaging the bottom surface (147) of the template ring, and an antifriction member (149) is provided on the bottom of said block (65) for engaging the upper surface (148) of the template ring.

33. Apparatus for cutting glass sheets, comprising a table for receiving a glass sheet to be cut, a template ring supported above said table and having two adjacent peripheral cam tracks provided with curved surfaces corresponding to the shape and size of the glass sheets to be cut, with one of said cam tracks being different from the other cam track, a cutter unit mounted to move along said template and including a cutting tool for cutting the glass, means for driving the cutter unit along said template, guide means carried by said cutter unit and engaging said template for guiding the cutter unit around the template, and means for automatically moving the cutter unit guide means upwardly or downwardly to bring said guide means into selective engagement with one or the other of said cam tracks.

34. Apparatus for cutting glass sheets as claimed in claim 33, including means operable when the cutter unit reaches a predetermined position along the template for automatically releasing the cutter guide means from engagement with the template and for raising the cutting tool from the glass sheet.

35. Apparatus for cutting glass sheets as claimed in claim 33, including means responsive to movement of the cutter unit for first slowing down the speed of travel thereof and then bringing it to a stop when said cutter unit reaches a predetermined stop position.

* * * * *